(12) United States Patent
Tantos et al.

(10) Patent No.: US 7,865,629 B1
(45) Date of Patent: Jan. 4, 2011

(54) CONFIGURABLE CONNECTOR FOR SYSTEM-LEVEL COMMUNICATION

(75) Inventors: Andras Tantos, Bellevue, WA (US); Todd L. Carpenter, Monroe, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 12/813,342

(22) Filed: Jun. 10, 2010

Related U.S. Application Data

(60) Provisional application No. 61/264,206, filed on Nov. 24, 2009, provisional application No. 61/324,236, filed on Apr. 14, 2010.

(51) Int. Cl.
 *G06F 13/10* (2006.01)
(52) U.S. Cl. .......................... 710/11; 710/8
(58) Field of Classification Search .................. None
 See application file for complete search history.

(56) References Cited

U.S. PATENT DOCUMENTS

| | | | | |
|---|---|---|---|---|
| 4,972,470 A * | 11/1990 | Farago | ........................ | 713/192 |
| 4,991,085 A * | 2/1991 | Pleva et al. | ..................... | 326/82 |
| 5,526,037 A * | 6/1996 | Cortjens et al. | ............. | 348/14.1 |
| 5,574,859 A * | 11/1996 | Yeh | ............................. | 710/300 |
| 5,738,534 A * | 4/1998 | Ingles et al. | ................... | 439/83 |
| 6,053,763 A * | 4/2000 | Brennan et al. | .............. | 439/491 |
| 6,148,398 A * | 11/2000 | Chang et al. | .................... | 713/1 |
| 6,189,052 B1 * | 2/2001 | Nilsson et al. | ................. | 710/48 |
| 6,215,704 B1 * | 4/2001 | Shimizu | ................ | 365/189.02 |
| 6,687,775 B1 * | 2/2004 | Bassett | ......................... | 710/70 |
| 6,825,689 B1 * | 11/2004 | Snyder | ......................... | 326/41 |
| 6,961,790 B2 * | 11/2005 | Swope et al. | ................. | 710/104 |
| 7,001,201 B1 * | 2/2006 | Peng | ........................... | 439/358 |
| 7,043,568 B1 * | 5/2006 | Klingman | ...................... | 710/8 |
| 7,089,466 B2 * | 8/2006 | Odom et al. | ................. | 714/724 |
| 7,096,298 B2 * | 8/2006 | Morrow et al. | .............. | 710/301 |
| 7,109,745 B2 * | 9/2006 | Mulligan | ...................... | 326/37 |
| 7,305,253 B2 * | 12/2007 | Snyder et al. | ............... | 455/557 |
| 7,558,900 B2 * | 7/2009 | Jigour et al. | ................. | 710/305 |
| 7,716,400 B2 * | 5/2010 | Raines | ......................... | 710/74 |
| 7,725,612 B2 * | 5/2010 | Boehm et al. | ................... | 710/8 |
| 7,762,818 B2 * | 7/2010 | Hoang | .......................... | 439/62 |
| 2004/0009702 A1 * | 1/2004 | Potega | ......................... | 439/578 |
| 2006/0029094 A1 * | 2/2006 | Chen et al. | ................... | 370/438 |
| 2007/0073936 A1 | 3/2007 | Cardenas et al. | | |
| 2008/0201505 A1 * | 8/2008 | Monroe | ......................... | 710/65 |
| 2009/0108848 A1 | 4/2009 | Lundquist et al. | | |
| 2009/0156060 A1 | 6/2009 | Hunkins | | |

* cited by examiner

*Primary Examiner*—Cheng-Yuan Tseng
(74) *Attorney, Agent, or Firm*—Klarquist Sparkman, LLP

(57) ABSTRACT

A host device comprises a controller and a connector. The host connector comprises fixed-function and multi-function pins. A first group of host connector pins comprises one or more of the fixed-function pins and a second group of pins comprises the remainder of the fixed-function pins and the multi-function pins. The host connector can be releasably attached to a connector of an accessory device. The first group of host connector pins can be used to discover the functions of the accessory connector. The host device can select functions to be enabled at the host and accessory connectors from among the functions mutually supported by the two connectors. The host can enable the selected functions at the host connector and can instruct the accessory to enable the selected functions at the accessory connector. The host can reconfigure host connector functions in response to a different accessory being attached to the host.

18 Claims, 16 Drawing Sheets

CONFIGURABLE CONNECTOR FOR SYSTEM-LEVEL COMMUNICATION

CROSS-REFERENCES TO RELATED APPLICATIONS

This application claims priority to, and the benefit of, U.S. Provisional Application Nos. 61/264,206, filed Nov. 24, 2009, and 61/324,236, filed Apr. 14, 2010, which are both incorporated herein by reference.

FIELD

The present disclosure relates to connectors, and, more particularly, connectors that can be dynamically configured.

BACKGROUND

Modern computing and mobile devices (smart phones, laptop computers, etc.) should be capable of physically connecting to and communicating with a wide variety of accessory devices (desktop computers, televisions, stereo receivers, etc.). Various communication interfaces are used to connect these devices and the physical connectors associated with the interfaces are usually incompatible. Thus, an electronic device may comprise several physical ports to allow connection to various accessories.

Some physical connectors can support more than one communication interface. Typically, each pin of such connectors supports only one function (data in, data out, clock, etc.) of an interface. Thus, these connectors often have a large pin count and consume extra device real estate, a precious commodity in hand-held devices. These connectors also suffer from low pin utilization if only one interface is used. Thus, the extra space consumed may not be put to efficient use.

To accommodate modifications to existing interfaces or entirely new interfaces, the physical design of a connector can be modified. Redesigned connectors are often incompatible with the previous designs, resulting in older devices unable to communicate with newer ones. Retrofitting a new connector design into existing devices is often difficult as connectors are typically integrated into a device. Thus, older devices may require physical adapters or other specialized hardware to communicate with newer devices. Connectors can be designed with extra pins to allow for future support of new interfaces and functions, but this also increases connector size and the extra pins will remain unused until the new interfaces are developed.

Multiple communication interfaces have been integrated into a single physical connector. For example, the VESA (Video Electronics Standards Association) DisplayPort Interoperability Guideline, Version 1.1a, sets a guideline for enabling interoperability between DisplayPort and other display standards through cable adapters. However, this approach relies on physical adapters to support the physical connection between multiple interfaces. Physical adapters can be more costly and complicate the connection scheme, especially for home users.

Accordingly, there is a need for a flexible and expandable connector that can support multiple communication standards at the system level.

SUMMARY

A connector and method are disclosed that allow for dynamic configuration of a connection between a host device, such as a mobile phone, and an accessory. The connection comprises a host device connector connected to an accessory connector. Each connector can be capable of supporting a set of functions, features, interfaces, protocols, etc. The host device can select from a set of mutually supported functions that a connection can support. The host device can configure pins of the host device connector to support the selected functions, and instruct the accessory device to do the same.

The connectors can comprise fixed-function pins and multi-function pins. The multi-function pins are configurable to support various functions. The fixed-function pins are not configurable. In some embodiments, the fixed-function pins can be used to discover the accessory connector functions. In other embodiments, the multi-function pins can be used to discover this information. The pins can be arranged into two physically separated groups of pins. The first group of pins can comprise fixed-function pins, and the second group of pins can comprise a combination of fixed-function and multi-function pins.

The host device can automatically configure the host connector in response to detecting an accessory being attached to the host device. Additionally, a host connector can be reconfigured if the host device detects that one accessory has been swapped out for another. The host device can also automatically reconfigure a connection if it detects that the transfer of data across the connection would be performed more quickly, more efficiently, etc., if a currently disabled connector function (protocol or interface) were used to transfer the data.

The host device can request the functions supported by an accessory connector and the accessory can send the requested functions to the host device in response. The host device can then select one or more functions to be enabled that both the host and accessory devices support. The accessory can receive an instruction from the host device to configure the accessory connector pins to support a selected set of functions. The accessory can enable the selected functions in response to receiving the instruction. In some embodiments, the accessory device can exclude sending connection functions to the host device that would be undesirable based on special knowledge contained in the accessory device. For example, if a function would exceed the accessory power budget, the accessory device can exclude such a function.

The host connector is typically integrated into the host device. The accessory device can be integrated into an accessory, such as a connector integrated into a personal computer. The accessory device can also be a docking station, in which case, the accessory can act as a physical adapter between the mobile host device connector and existing standard physical connectors (USB, D-sub connector, etc.). In any event, the accessory device is generally releasably attached to the host through a catch or mating connectors.

The foregoing and other objects, features and advantages of the invention will become more apparent from the following detailed description, which proceeds with reference to the accompanying Figures.

DETAILED DESCRIPTION

As used in this application and in the claims, the singular forms "a," "an," and "the" include the plural forms unless the context clearly dictates otherwise. Additionally, the term "includes" means "comprises."

The described systems, apparatus and methods described herein should not be construed as limiting in any way. Instead, the present disclosure is directed toward all novel and nonobvious features and aspects of the various disclosed embodiments, alone and in various combinations and sub-combinations with one another. The disclosed systems, methods, and apparatus are not limited to any specific aspect or feature or combinations thereof, nor do the disclosed systems, methods, and apparatus require that any one or more specific advantages be present or problems be solved.

Although the operations of some of the disclosed methods are described in a particular, sequential order for convenient presentation, it should be understood that this manner of description encompasses rearrangement, unless a particular ordering is required by specific language set forth below. For example, operations described sequentially can in some cases be rearranged or performed concurrently. Moreover, for the sake of simplicity, the attached Figures cannot show the various ways in which the disclosed systems, methods and apparatus can be used in conjunction with other systems, methods and apparatus. Additionally, the description sometimes uses terms like "produce" and "provide" to describe the disclosed methods. These terms are high-level abstractions of the actual operations that are performed. The actual operations that correspond to these terms will vary depending on the particular implementation and are readily discernible by one of ordinary skill in the art.

Theories of operation, scientific principles or other theoretical descriptions presented herein in reference to the apparatus or methods of this disclosure have been provided for the purposes of better understanding and are not intended to be limiting in scope. The apparatus and methods in the appended claims are not limited to those apparatus and methods that function in the manner described by such theories of operation.

Figure 1:
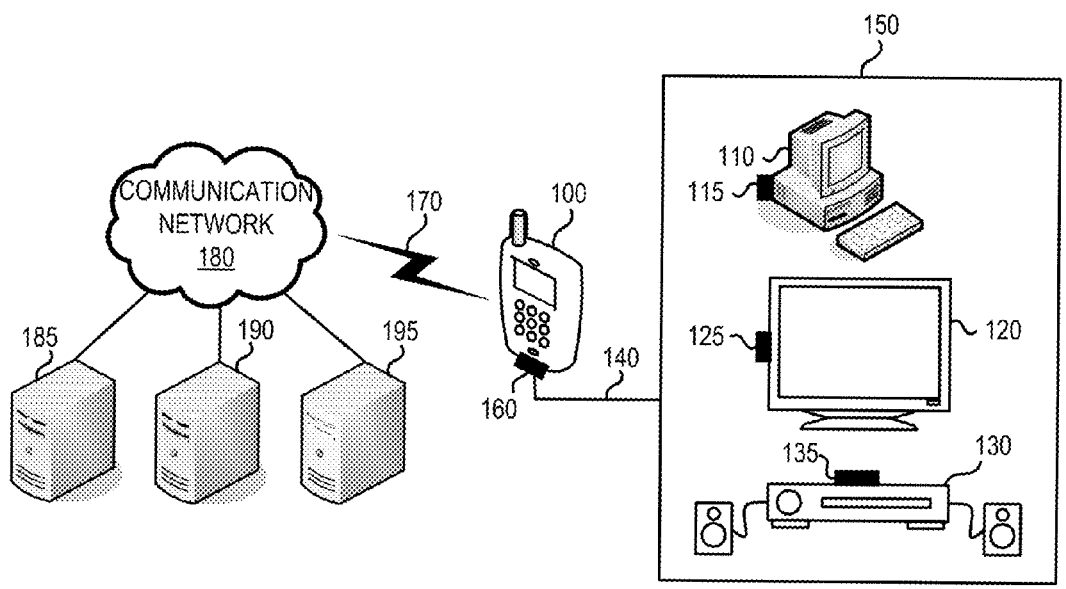
FIG. 1 shows an exemplary mobile host device connected to one of several accessories by a host connector.

Turning now to the drawings, FIG. 1 shows a host mobile device 100 (host), such as a mobile phone, connected to an accessory device (accessory) 150 by a physical connection 140 (e.g., a multi-wire cable). The accessory 150 can be, for example, a personal computer 110, a television 120 or an audio player 130. The physical connection 140 connects a host connector 160 to an accessory connector 115, 125 or 135 integrated into an accessory 110, 120 or 130. The connectors 160, 115, 125 and 135 generally are either male or female and include a grouping of two or more physical pins. The connection 140 can support a wide range of connectors, communication interfaces, protocols, features and functions. For example, the connection 140 can comprise USB (Universal Serial Bus), HDMI (High Definition Multimedia Interface), PCI-Express, DisplayPort, MHL (Mobile High-Definition Link), SATA (Serial ATA) and/or SPDIF (Sony/Philips Digital Interface) connections. The connection 140 can also support mass storage, CD/DVD-ROM, web-cam and HID (Human Interface Device) devices or an FM transmitter. The connection 140 can be as simple as a stereo cable with a built-in FM antenna. The connection 140 can support one or more of these connections, interfaces, features or functions. For example, the connection 140 can support both USB 3.0 and HDMI, with separate cables or a single cable providing the physical USB and HDMI connections. In addition, the connection 140 can support additional protocols such as 5.1 audio or Ethernet via tunneling over one or more supported protocols, such as USB or PCI-Express. The terms "function," "features," "interface," "protocol" and "connector" may be used interchangeably and refer to any feature, function, interface, connection, connector, etc. supported by a connection between a host device 100 and an accessory device 150.

Although shown as a mobile phone, the host device 100 can be any type of general computing or mobile device such as a personal computer, media player or personal digital assistant. In general, the host device can be handheld but the connector described herein can also be used on devices that are typically not handheld, such as a desktop computer. An accessory 150 can be any device capable of physically connecting to and being electronically coupled with the host device 100. For example, in addition to the accessory personal computer 110, television 120 and audio player 130, the accessory 150 can be a set of headphones, a microphone, an FM antenna or other device.

The terms "host" and "accessory" as used herein indicate a master-slave relationship between connected devices with respect to the discovery of a function set supported by an accessory connector and configuring the capabilities of the host and accessory connectors. As discussed in detail below, the host device is typically the master device. The host device requests information from the accessory device, selects the connector functions to be enabled, and instructs the accessory device to enable the selected connector functions. The accessory device is typically the slave device. The accessory device sends requested information to the host device and configures accessory connector functions in response to instructions received from the host device.

The host 100 can be connected to a communication network 180 via a communication link 170. The communication link 170 can be a wired or wireless link. The communication network 180 can be a personal area network (PAN), local area network (LAN), the Internet, a cellular or satellite mobile communication network, or any other communication network. The communication configuration shown in FIG. 1 allows users to perform a wide variety of operations. For example, the host device 100 can download or stream media files (audio, video, etc.) provided by servers 185, 190 and 195 for output at an accessory device 150. In another example, the host 100 can download or upload information to the personal computer 110 to synchronize the host 100 with information stored on the computer 110.

Figure 2:
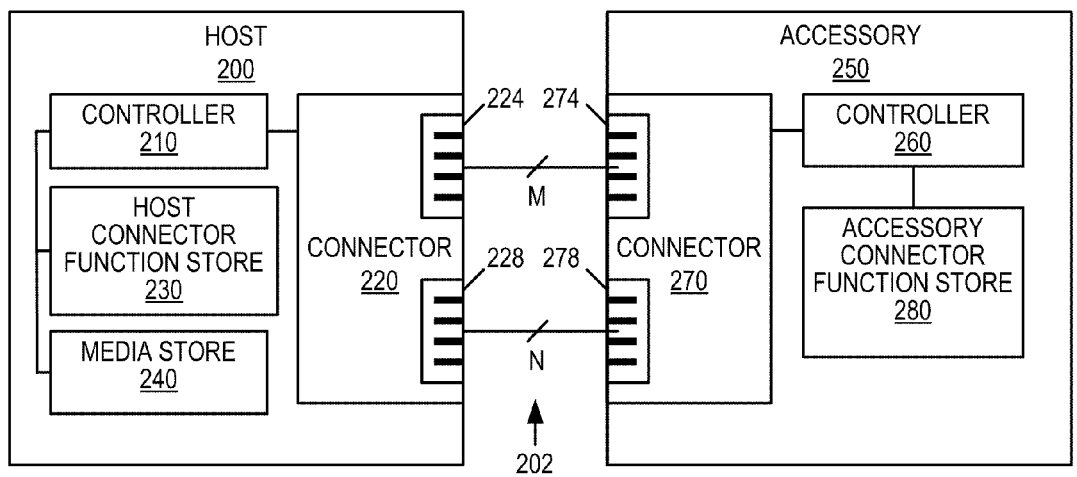
FIG. 2 is a block diagram of an exemplary mobile host device connected to an exemplary accessory device.

FIG. 2 is a block diagram of an exemplary host 200 connected to an exemplary accessory 250 via a cable, shown generally at 202. The host 200 and accessory 250 can be connected by coupling of a host connector 220 and an accessory connector 270. Such couplings can be releasably attachable, such as through cable connections or mating female-/male-type connectors. The host 200 can comprise a controller 210, the host connector 220 and a host connector function store 230. The controller can be any microprocessor or microcontroller, as is known in the art. The host 200 can also comprise a media store 240. The host connector 220 can comprise M fixed-function pins 224 and N multi-function pins 228 where M and N are any integer numbers depending on the particular application. Each of the fixed-function pins 224 can have a dedicated function, such as providing a power or ground connection or hosting the function of a pin of a USB port. The functions supported by the fixed-function pins typically are not changed during operation of the host device. That is, the fixed-function pins are not configurable. Each of the multi-function pins 228 can be configurable and can support more than one function. For example, a multi-function pin can operate as a USB pin in a first configuration, an HDMI pin in a second configuration, and a DisplayPort pin in a third configuration.

The host controller 210 can be coupled to the host connector 220, the host connector function store 230 and the media store 240. The host connector function store 230 stores one or more functions supported by the host connector. Thus, the function store 230 stores a plurality of possible pin configurations that can be dynamically applied to the connector 220 for on the fly pin configurations. The host controller 210 can reference the host connector function store 230 when determining which host connector and accessory connector functions to enable. A function can specify, for example, an interface supported by the host connector (HDMI, DisplayPort, PCI-Express, etc.) and can include a mapping of connector pins to interface pins. For example, a function indicating that the host connector 220 supports HDMI can indicate that host connector pin 13 is configured to operate as the DDC_DATA pin, pin 15 is configured to operate as the DDC_CLK pin, etc. The stored functions can also indicate the functions of fixed-function pins. For example, a stored function can indicate that pin 1 of the host connector 220 can operate as an FM antenna, pin 3 can operate as analog ground, etc. The media store 240 can store one or more media files (audio, video, etc.) that can be communicated across a host-accessory connection. As will be described in detail below, the host controller 210 can select which connector functions can be enabled in a host-accessory connection. The host connector function store 230 and the media store 240 can be memory such as volatile memory (e.g., registers, cache, RAM), non-volatile memory (e.g., ROM, FPGA, EEPROM, flash memory, etc.) or some combination of the two.

The accessory device 250 comprises a controller 260, a connector 270 and an accessory connector function store 280. The accessory connector 270 can comprise M fixed-function pins 274 and N multi-function pins 278. The host connector fixed-function pins 224 can be connected to the accessory connector fixed-function pins 274, and the host connector multi-function pins 228 can be connected to the accessory connector multi-function pins 278. The pins of the host connector 220 can be arranged such that the fixed-function pins 224 and the multi-function pins 228 are physically interspersed among each other. Alternatively, the fixed-function pins 224 can be physically arranged to be separate from the multi-function pins 228. The pins 274 and 278 of the accessory connector 270 can be similarly arranged. The host and accessory connectors 220 and 270 can comprise one or more physical ports or connectors. For example, the host connector 220 can comprise a micro-USB port comprising a set of fixed-function pins and a second port comprising the remainder of the fixed-functions pins and the multi-function pins. In another example, a connector can comprise a single physical port that includes all of the connector pins.

The accessory controller 260 can be connected to the accessory connector 270 and the accessory connector function store 280. The accessory connector function store 280 can store functions supported by the accessory connector in a manner similar to that described above in regard to the functions stored in the host connector function store 230.

Although the host and accessory devices in FIGS. 1 and 2 are shown as one connector, any of the host or accessory devices described herein can comprise more than one connector. For example, host 200 can comprise multiple connectors 220, allowing the host 200 to simultaneously connect to multiple accessories 250. The host controller 210 can be connected to each of the host connectors. In one embodiment of a host device connected to multiple accessory devices via dynamically configurable connectors, a mobile phone host device can connect to an external speaker system and a personal computer. Similarly, accessory 250 can comprise multiple connectors 270 to allow connection to multiple hosts 200. In one embodiment of an accessory device connected to multiple host devices via multiple dynamically configurable connectors, an accessory television can be connected to multiple host mobile phones.

Figure 3:
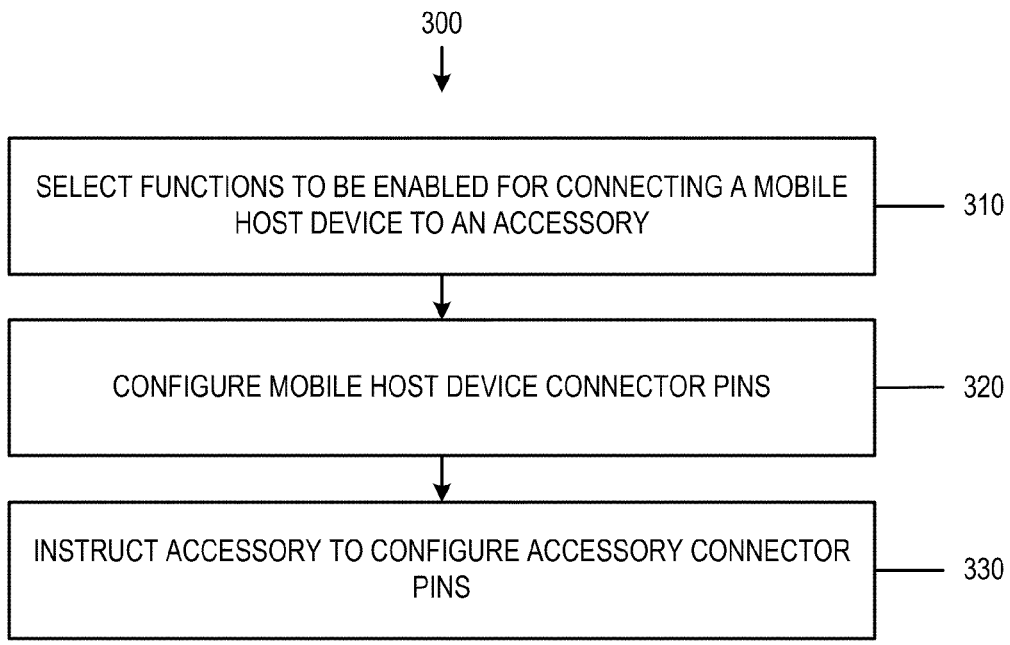
FIG. 3 is a flowchart of an exemplary method of configuring a mobile host device connector for connecting to an accessory device connector.

FIG. 3 is a flowchart of an exemplary method of configuring a mobile host device for connecting to an accessory. The host connector can be dynamically configured in response to an accessory being attached to the host device, operations or transactions that are being performed or scheduled to be performed, etc. For example, the method 300 could be executed in response to a mobile player being releasably attached to a television. At 310, the mobile host device can select connector functions to be enabled for connecting a mobile host device to an accessory. Information regarding the accessory connector functions can be received from the accessory or another source, and can be stored at the host device. Such information can be communicated via the fixed pins. Additionally, such information can be received in response to a request from the host device. At 320, the mobile host device can configure pins of the mobile host device connector. For example, configuring the pins can comprise assigning each pin to be configured as a pin function associated with one of the selected connector functions. For example, if the mobile host device selects the USB interface to be enabled, configuring the pins can comprise assigning individual host device connector pins to support the DATA−, DATA+, VCC and VDD pin functions of the USB interface. Configuration of the pins can be static (i.e., the pin configuration for a given function can be determined during host and accessory device design and implemented during device manufacture) or the pin configuration can be dynamic. For example, in dynamic pin configuration, during operation of the mobile host device, a first multi-function pin can support the DATA− pin function in a first configuration, and a second multi-function pin can support the DATA+ pin function in a second pin configuration. Connector pin configuration can comprise the host device enabling the selected connector functions. Prior to step 320, the host connector can be unconfigured or previously configured. An unconfigured connector can have one or more connector functions disabled or a set of default functions enabled. Pins that are not enabled in a particular configuration can be kept in a high impedance state until configured. Hardware for putting pins into high-impedance mode is well known in the art, such as tri-state gates.

In some embodiments, enabling the selected connector functions comprises, for each of the pins to be configured, configuring the host device such that one of a plurality of host device pin controllers (discussed below in regards to FIG. 4) controls (i.e., transmits and receives signals from) the pin. For example, if pin 13 of the host mobile phone is capable of being controlled by an HDMI DDC DAT pin controller or a PCIEX CLK+ pin controller, the mobile phone can be configured such that the HDMI DDC DAT pin controller controls pin 13. For example, the HDMI DDC DAT pin controller can be enabled and the PCIEX CLK+ pin controller can be disabled, or, if the pin controllers are connected to pin 13 by a switch, the switch can be configured to connect the HDMI DDC DAT controller to pin 13.

At 330, the host device can instruct the accessory device to configure the accessory connector pins to support the selected functions. The mobile host device can instruct the accessory by sending an instruction over the host-accessory connection. This instruction can constitute a "function set" or "mode set" command. In the example of a media player being connected to a television, after process block 330, the connection can be configured to support HDMI or another multimedia interface. Optionally, the host device can receive acknowledgement or confirmation that the accessory device has successfully enabled the selected accessory connector functions. After configuring the host device connector pins, the host device can load the necessary drivers to support the enabled connector functions. The drivers can be loaded from the host device store 230, or downloaded from a remote resource connected to the host device over a network. In addition, the host device can then inform applications and other devices connected to the host device that the enabled functions are available for use. The host device can then begin appropriate communications over the host-accessory connection using the enabled connection functions.

In other embodiments, the method 300 can further comprise authentication of an accessory. A host device can send an authentication request to the accessory device. In response, the accessory can provide authentication information to the host. The host device can attempt to authenticate the accessory device based on the received information. If the host device can authenticate the accessory, the host device can instruct the accessory device to configure the accessory connector. That is, the accessory can enable a set of accessory connector functions in response to receiving a "function set" instruction from the host. The host can request authentication information from accessories having configurable connectors, such as personal computers and mobile devices. Authentication may not be required for certain classes of accessories, depending on the accessories' supported feature set.

Figure 4:
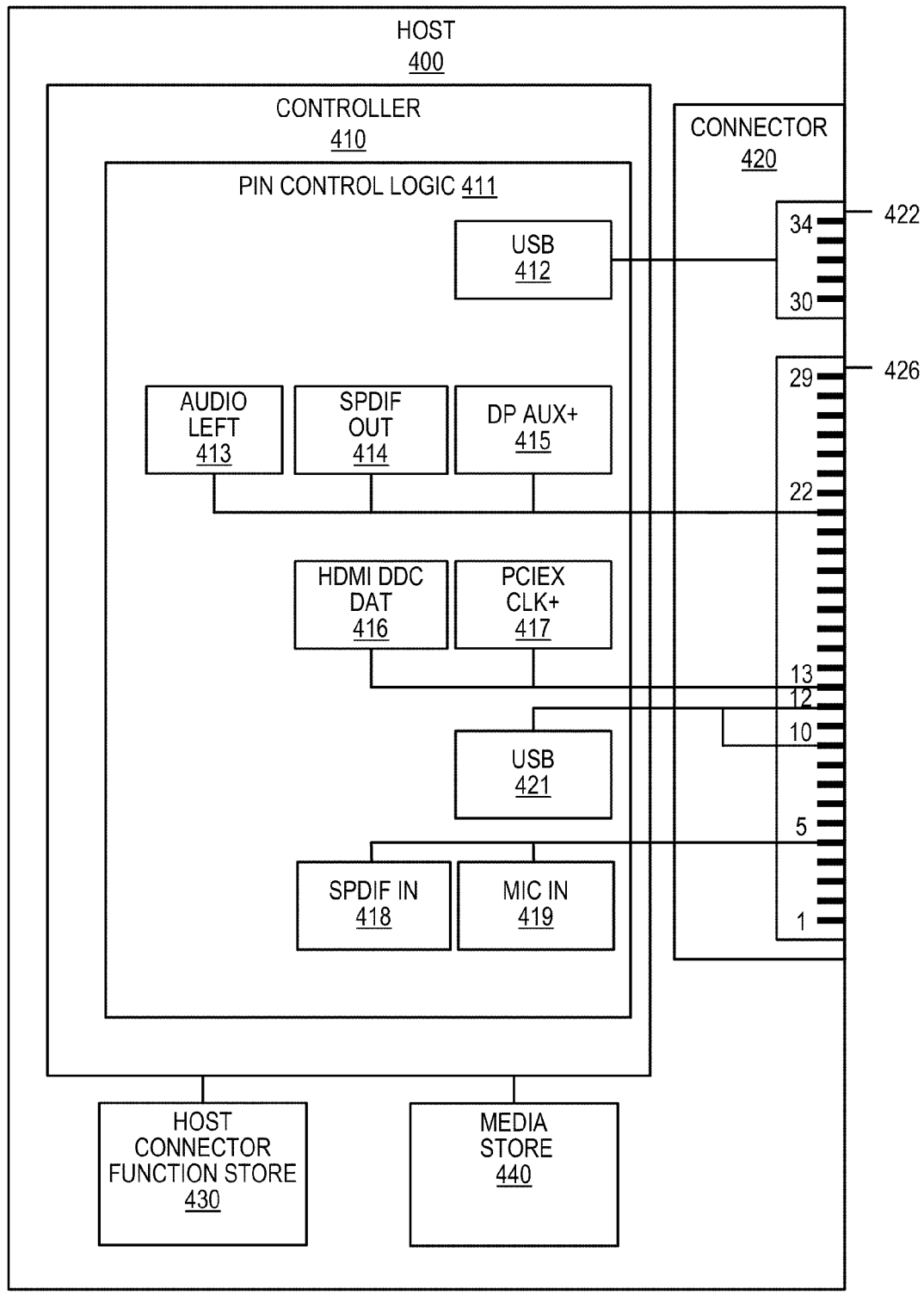
FIG. 4 is a block diagram of an exemplary mobile host device showing several multi-function pins capable of being controlled by multiple pin controllers.

FIG. 4 is a block diagram of an exemplary host device 400 showing several fixed and multi-function pins 426 capable of being controlled by pin controllers 412-419 and 421. The host 400 comprises a controller 410, a connector 420, a host connector function store 430 and a media store 440. The connector 420 comprises 34 pins physically arranged in two different groups. The first group of pins 426 comprises 29 pins (pins 1 through 29) and contains a combination of fixed-function and multi-function pins. The second group of pins 422 comprises five fixed-function pins (pins 30-34) which can be compatible with the micro-USB specification published by the USB Implementers Form (available at http://www.usb.org/). In some embodiments, select pins within the first group of pins 426 can be used to discover the functions supported by an accessory connector connected to the host 400. For example, pins 10 and 12, controlled by USB controller 421, can be used to send a request to a connected accessory for the functions supported by the accessory connector and to receive the response from the accessory. In other embodiments, any other low pin count serial interface such as RS-232 can be used for this functionality. The received accessory connector functions can be passed from the second group of pins 426 to the controller 410.

The host controller 410 comprises pin control logic 411. The pin control logic 411 comprises pin controllers 412-419 and 421 that provide the functions supported by the multi-function pins. For example, the USB controller 412 controls the second group of pins 422 and provides a micro-USB interface at these pins. No other pin controller connects to fixed-function pins 30-34, as these pins are not configurable.

More than one pin controller can be connected to the multi-function pins. For example, Audio Left, SPDIF OUT and DP AUX+ (DisplayPort Auxiliary Pin (positive)) controllers 413, 414 and 415 are connected to multi-function pin 22. Thus, in this example, pin 22 is capable of supporting any one of three functions. Pin 22 can deliver left-channel analog audio output in a first configuration, operate as the output pin in the SPDIF interface in a second configuration and operate as the auxiliary (positive) pin in the DisplayPort interface in a third configuration. The pin control logic 411 ensures that each multi-function pin is controlled by no more than one pin controller at any given time. In some embodiments, a multiplexer (not shown) or other switch (e.g., tri-state gate) can be used to connect one of the pin controllers to a multi-function pin. In other embodiments, one pin controller connected to a multi-function pin can be enabled and the other pin controllers connected to the multi-function pin can be disabled. The multiplexer or switch can be a component separate from the pin controller 410, or it can be integrated into the controller circuitry. The pin control logic 411 should be configured such that pin controllers that operate concurrently are connected to different multi-function pins. For example, Audio Left and Right controllers should not be connected to the same multi-function pin as these controllers operate concurrently when the stereo analog audio output function is enabled.

Multi-function pins 5 and 13 support multiple functions in a similar manner. HDMI DDC DAT and PCIEX CLK+ controllers 416 and 417 are connected to pin 13 and SPDIF IN and MIC IN controllers 418 and 419 are connected to pin 5. Thus, pin 13 can be configured to operate as the DDC DAT pin of the HDMI interface, or as the CLK+ pin of the PCI Express interface. Pin 5 can be configured to operate as the INPUT pin of the SPDIF interface or as a microphone input pin.

The pin controllers 412-419 and 421 can be related to the multi-function pins by a "many-to-one" relationship. That is, each of the multi-function pins can be configured to support a dedicated set of functions. In the example shown in FIG. 4, only pin 22 can operate as the Audio Left, SPDIF OUT or DP AUX+ pins. The pin control logic 411 can comprise duplicate pin controllers for a given function to provide for multiple ports of an interface. For example, connector 420 can support two DisplayPort channels if two sets of DisplayPort controllers can control two independent sets of multi-function pins.

To provide additional flexibility, pin controllers can be related to multi-function pins by a "many-to-many" relationship. In this arrangement, pin controllers can be configured to control more than one multi-function pin. For example, pin control logic 411 can be configured to connect HDMI DDC DAT controller 416 to pin 13 in one configuration, and to another multi-function pin in a second configuration.

The host controller 410 can select the host and accessory connector functions to be enabled. The controller 410 can select the connection functions based on the accessory connector functions received from the accessory device and the host connector functions accessed from the host connector function store 430. The controller 410 can leave one or more host connector functions or accessory connector functions unselected, or, the controller 410 can select all host and accessory connector functions. The selected connector functions are selected from among the host connector functions and the accessory connector functions according to selection criteria. In some embodiments, the selection criteria can be that the selected connector functions are supported by both the host and accessory devices. Thus, the controller 410 can select one or more functions that are mutually supported by the host and accessory connectors to be enabled. In other embodiments, the connector functions can be selected according to different or additional criteria, such as connection function power consumption, function bandwidth, function speed, which applications are currently executing or are scheduled for execution on the host and/or accessory devices, etc. Thus, function selection can comprise performing matching, comparing and/or other operations whose outcomes provides a measure or indication of whether a given connector function is to be selected for enablement at the host and accessory connectors. In some embodiments, the selection, or negotiation, of connector functions to be enabled can be asymmetric. That is, the host device selects which functions are to be enabled. The accessory device does not participate in the selection of which connection functions are to be enabled. The accessory device responds to requests for information from the host device and enables accessory connector functions as instructed by the host device. In other embodiments, the negotiation can be symmetric. That is, both the host and accessory participate in selecting which connector functions are to be enabled. An accessory device can select one or more connector functions to be enabled and can send these functions to the host device. The host controller can then select connector functions to be enabled based in part on the selected connector functions sent by the accessory.

The host controller 410 can also be configured to dynamically reconfigure the host connector 420 depending on the operations being performed or scheduled to be performed by the host 400. For example, if a host 400 is scheduled to synchronize with a personal computer accessory device, a large amount of data can be scheduled to be sent over the host-accessory connection. If the connector can support an interface capable of a higher data transfer rate than any of the connector functions currently enabled, the controller 410 can determine that the higher data rate interface should be enabled. For example, the controller 410 can determine that a USB 3.0 interface should be enabled before the synchronization operation begins. The synchronization operation can then use the newly enabled USB 3.0 interface. In some embodiments, the controller 410 can reconfigure the host connector 420 to restore the previous connector configuration after the sync operation is completed. Alternatively, the controller 410 can be configured to keep the host connector 420 in the new configuration.

The controller 410 can reconfigure the host connector 420 in response to other operations or transactions. For example, the controller 410 can enable a video data interface such as HDMI in response to determining that a current operation involves the transfer of video data across a host-accessory connector, if a video interface is not presently enabled. The controller 410 can determine which connector functions to enable in response to operations performed or scheduled to be performed based on algorithms hard-wired into controller circuitry, controller firmware, software running on the host 400, user settings, or any combination thereof. For example, the user can request an operation through a GUI. In order to carry out the operation, the host connector can by dynamically reconfigured to most effectively communicate with the accessory in response to the user input. For instance, if user indicates that he or she wishes to play a movie stored on the host mobile device on a connected television, the host device can reconfigure the mobile device-television connection to enable an interface capable of high data transfer rates, or an interface designed for multimedia communication.

A controller of an accessory device as described herein can comprise one or more of the components of the host device controller 410 described above. For example, an accessory device controller can comprise pin control logic. The pin control logic can be capable of transmitting and receiving signals to/from the pins of the accessory device connector using individual pin controllers. The accessory device pin control logic can ensure that each multi-function accessory connector pin is operatively coupled to one pin controller at any given time. In some embodiments, a multiplexer (not shown) or other switch (e.g., tri-state gate) can be used to connect one of the accessory device pin controllers to an accessory connector multi-function pin. In other embodiments, one accessory device pin controller connected to a multi-function pin can be enabled and the other accessory device pin controllers connected to the multi-function pin can be disabled to allow the accessory pin to be controlled by a single pin controller.

Figure 5:
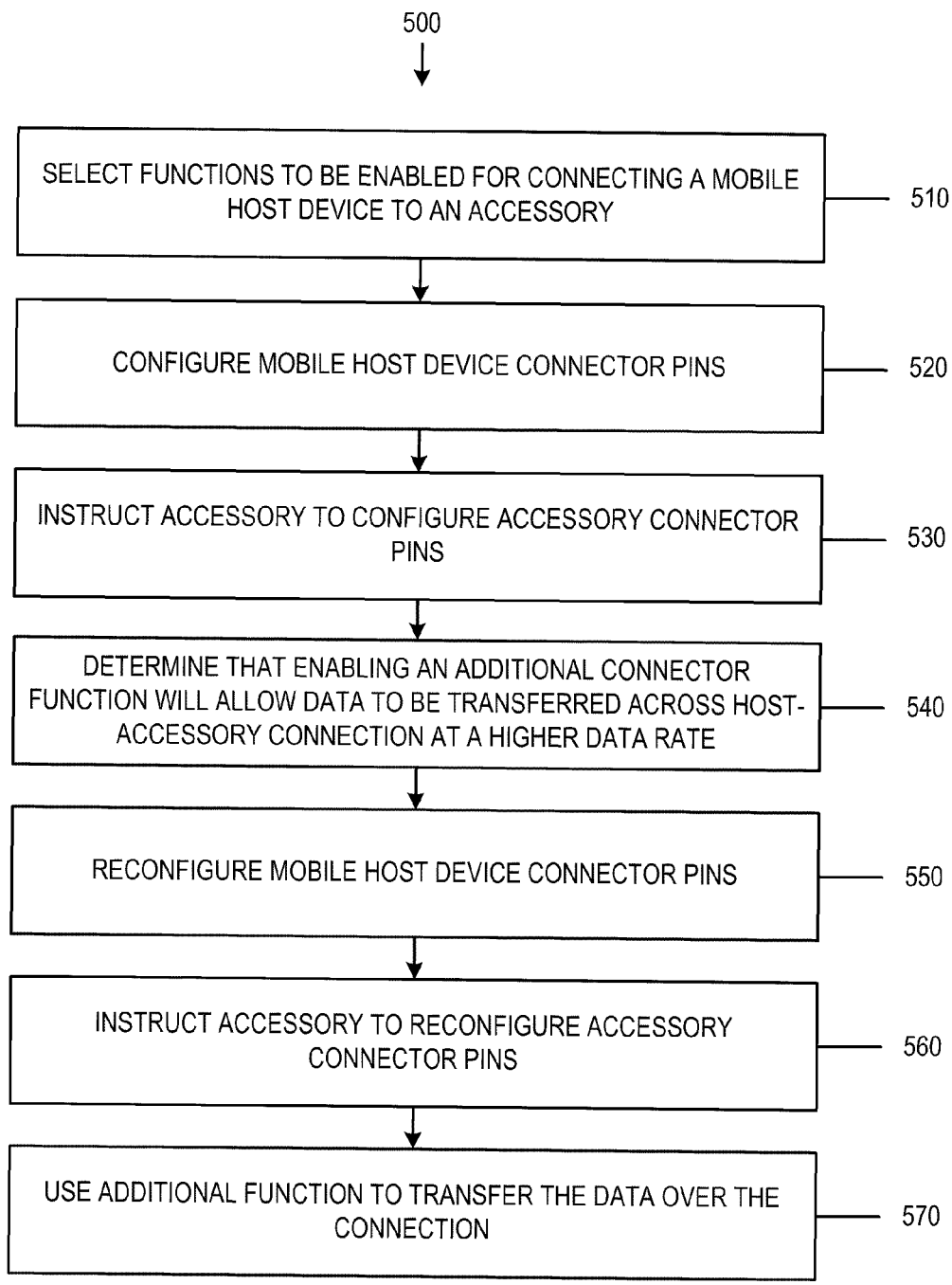
FIG. 5 is a flowchart of an exemplary method of reconfiguring a host connector to enable a high data rate connector function.

FIG. 5 is a block diagram of an exemplary method 500 for reconfiguring a host connector to enable a high data rate function. At 510, one or more functions to be enabled at a host connector and at an accessory connector can be selected. At 520, the one or more selected functions can be enabled at the host connector. At 530, an instruction to enable the one or more selected functions at the accessory connector can be sent to the accessory device. At 540, the host device can determine that an operation currently being performed or scheduled to be performed and involving the transfer of data over the host-accessory connection can be completed in a shorter amount of time by enabling an additional function of the host and accessory connectors not currently enabled. At 550, the additional function can be enabled at the host device connector. At 560, an instruction can be sent to the accessory device to enable the additional function at the accessory device connector. At 570, the additional function can be used to transfer data over the connection. The operations 550, 560 and 570 can be performed in response to the determination at 540. Thus, the host can monitor performance of enabled connector functions and dynamically reconfigure the host and accessory connectors in response to the monitoring. The reconfiguration can comprise adding or replacing a function to the set of enabled functions. Reconfiguration can take place without disrupting other enabled connector functions. For example, transfer of data can be maintained on some pins while additional functionality is enabled at other pins not being used.

The host controller 410 can be configured to avoid function collision. For example, a globally unique identifier (GUID)

can be associated with each supported functionality having a unique pinout. The host controller 410 can be configured to require that mutually supported functions have the same GUID before enabling the function. Consider an example where a host supports HDMI on pins 14-20 and PCI-Express on pins 21-24, and an accessory supports HDMI on pins 18-24. The HDMI functions supported by the host and the accessory can be associated with different GUIDs. The host controller will not enable the HDMI functions as they are associated with different GUIDs. Thus, the host controller avoids connecting accessory HDMI pins to host PCI-Express pins. The host controller also avoids connecting accessory HDMI pins to incorrect host HDMI pins.

Figure 6:
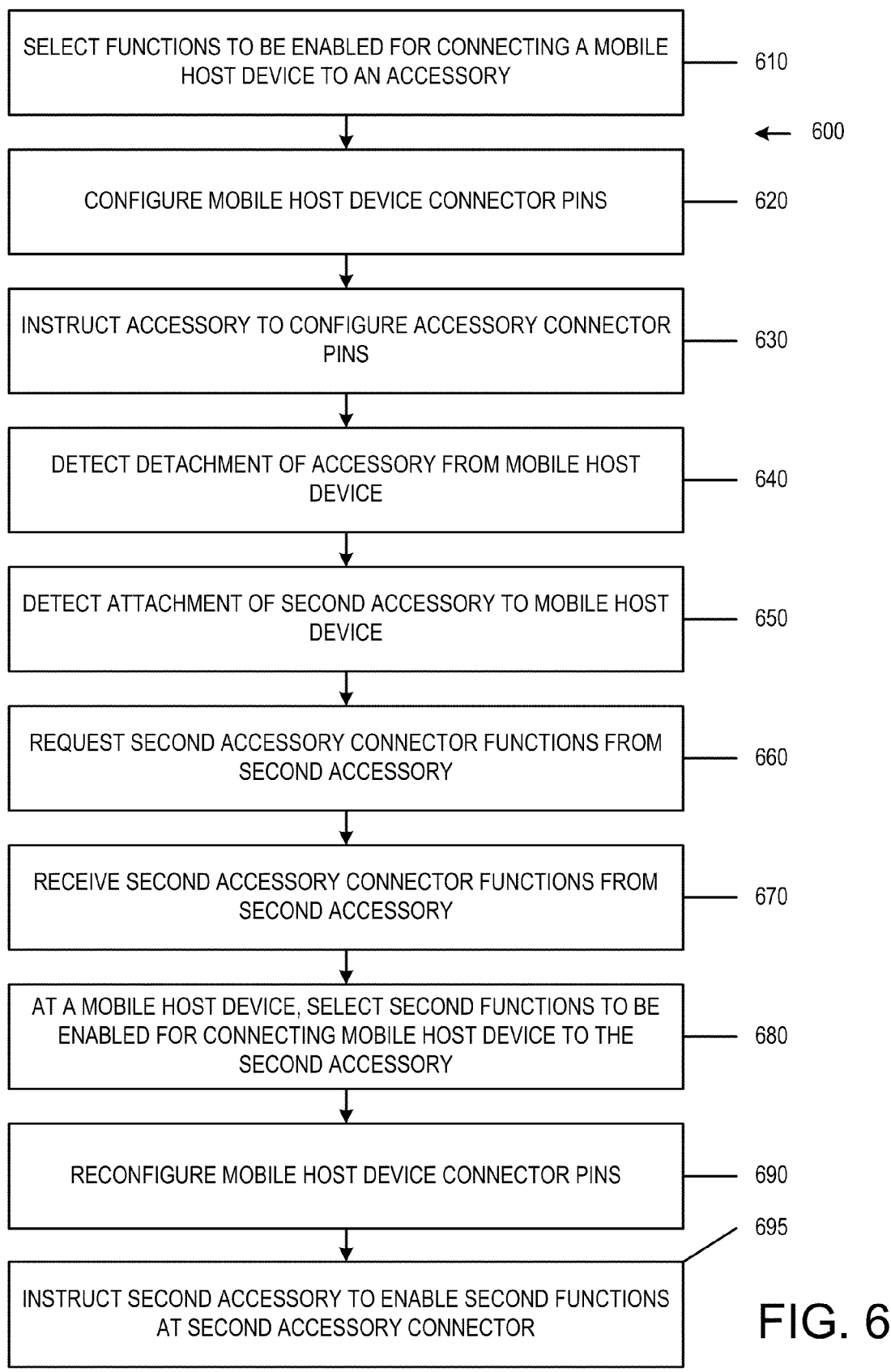
FIG. 6 is a flowchart of an exemplary method of reconfiguring a host connector in response to a second accessory being connected to a mobile host device in place of a first accessory or otherwise being connected to the mobile host device after being disconnected.

FIG. 6 is a flowchart of an exemplary method reconfiguring a host connector in response to a second accessory being connected to a mobile host device in place of a first accessory. For example, method 600 could be executed in response to a user first connecting a mobile phone to a stereo receiver to listen to songs stored on the phone, and then, later, disconnecting the stereo receiver and connecting a television to the phone to watch a movie. At 610, the mobile host device can select one or more first functions to be enabled at a host connector for connecting to an accessory. At 620, the host device can configure the pins of the host connection to support the selected functions. At 630, the host device can instruct the accessory device to configure the accessory connector pins to support the selected functions. At 640, detachment of the accessory from the host device can be automatically detected. For example, some pins can be periodically monitored for connectivity, such as by monitoring the current flow or signal switching. If a predetermined period of inactivity occurs, it can be determined that the accessory has been disconnected. Another technique for automatic detection is to simply look for voltage level changes on pins wherein one state indicates an "attached state" and another an "non-attached" state. At 650, attachment of a second accessory to the host device can be detected. This can be again through monitoring of current or pin activity. It can be assumed that after a disconnect, a new accessory was connected. At 660, the host device can request the second accessory connector functions from the second accessory device. At 670, an indication of one or more functions supported by the second accessory connector can be received from the second accessory. At 680, the host device can select one or more second functions to be enabled at the second accessory connector and the host device connector. At 690, the host device can configure the pins of the host connection to support the selected second functions. At 695, the second accessory device can be instructed to configure the second accessory connector to support the selected second functions. Thus, the host device can automatically and dynamically reconfigure pins based on replacement of a first accessory with a second accessory.

The method 600 can further comprise placing the host connector in an unconfigured or a previous configuration in response to detecting the first accessory device being detached from the host device. The host controller can place the pins into a high-impedance state, enable a default set of connector functions or enable a set of connector function associated with a previous configuration of the host controller.

Figure 7:
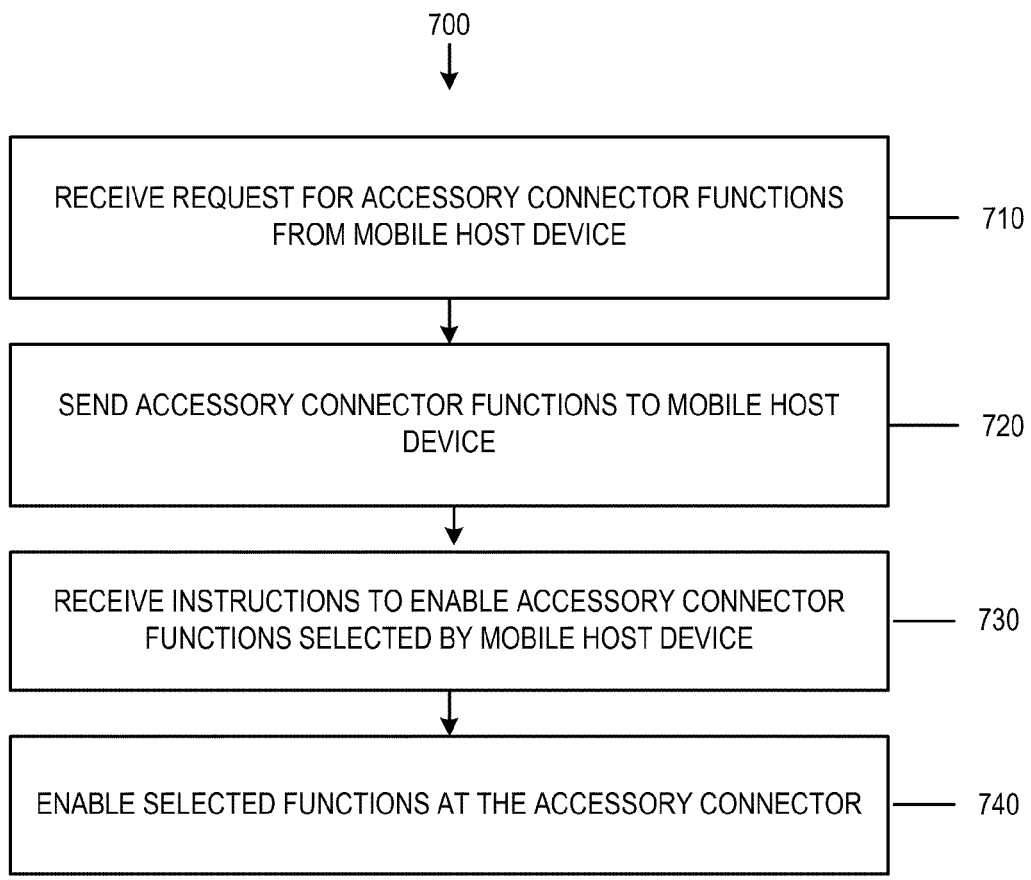
FIG. 7 is a flowchart of an exemplary method of configuring an accessory connector connected to a host connector.

FIG. 7 is a block diagram of an exemplary method 700 for configuring an accessory connector connected to a host connector. At 710, a request can be received from a host device that is releasably attached to the accessory device for the functions supported by the connector of the accessory device. At 720, an indication can be sent from the accessory device to the host device of one or more functions supported by the accessory device connector. At 730, an instruction can be received by the accessory from the host device to enable one or more selected functions at the connector of the accessory device. At 740, the one or more selected functions can be enabled at the connector of the accessory device. In some embodiments, enabling the functions at the accessory device connector comprises, for each of the pins to be configured, configuring the accessory device such that one of a plurality of accessory device pin controllers controls the pin. For example, if pin 13 of the accessory device is capable of being controlled by an HDMI DDC DAT pin controller or a PCIEX CLK+ pin controller, the accessory can be configured such that the HDMI DDC DAT pin controller controls pin 13. For example, the HDMI DDC DAT pin controller can be enabled and the PCIEX CLK+ pin controller can be disabled, or, if the pin controllers are connected to pin 13 by a switch, the switch can be configured to connect the HDMI DDC DAT controller to pin 13.

The accessory device connector can be unconfigured or previously configured prior to enabling the one or more selected functions at the accessory device connector. The accessory device can be reconfigured by receiving an instruction to enable additional functions and then enabling the additional functions at the accessory connector. An accessory controller can place the accessory connector in an unconfigured or a previous configuration in response to detecting separation of the accessory from a host. The accessory controller can place the pins into a high-impedance state; enable a default set of connector functions or enable a set of connector function associated with a previous configuration of the accessory controller.

Table 1 shows an exemplary set of connection configurations for the exemplary 34-pin host connector shown in FIG. 4.

TABLE 1

| | | | | Active Accessory | | | | |
|---|---|---|---|---|---|---|---|---|
| Pin | Passive Accessory | HDMI | Display Port, 4 lanes | PCI Express, 2 lanes | Display Port 1 lane, PCI Express, 1 lane | Display Port 2 lanes USB 3.0 | MHL, USB 3.0 | Pin type |
| 1 | | | | FM_ANT (FM antenna) | | | | F |
| 2 | | | | AUDIO_L (left channel audio) | | | | M |
| 3 | | | | AGND (analog ground) | | | | F |
| 4 | | | | AUDIO_R (right channel audio) | | | | M |
| 5 | MIC_IN | | | MIC_IN/SPDIF_IN | | | | M |
| 6 | | | | PHONE_DET (phone detection) | | | | F |
| 7 | PASS_ACC_DET | | | SPDIF_OUT | | | | M |

TABLE 1-continued

| | | Active Accessory | | | | | |
|---|---|---|---|---|---|---|---|
| Pin | Passive Accessory | HDMI | Display Port, 4 lanes | PCI Express, 2 lanes | Display Port 1 lane, PCI Express, 1 lane | Display Port 2 lanes USB 3.0 | MHL, USB 3.0 | Pin type |
| 8 | NC | HDMI_HPD | NC | NC | NC | NC | CTRL | F |
| 9 | | | | POWER_REQ | | | | F |
| 10 | NC | | | HOST_DM | | | | F |
| 11 | | | | GND | | | | F |
| 12 | NC | | | HOST_DP | | | | F |
| 13 | NC | HDMI_DDC_DAT | DP_TXD3n | PCIEX_RCKn | PCIEX_RCKn | USB_RXDn | USB_RXDn | M |
| 14 | | | | GND | | | | F |
| 15 | NC | HDMI_DDC_CLK | DP_TXD3p | PCIEX_RCKp | PCIEX_RCKp | USB_RXDp | USB_RXDp | M |
| 16 | NC | HDMI_TXCN | DP_TXD2n | PCIEX_TXD1n | PCIEX_TXD1n | USB_TXDn | USB_TXDn | M |
| 17 | | | | GND | | | | F |
| 18 | NC | HDMI_TXCP | DP_TXD2p | PCIEX_TXD1p | PCIEX_TXD1p | USB_TXDp | USB_TXDp | M |
| 19 | NC | HDMI_TXD0N | DP_TXD1n | PCIEX_RXD1n | PCIEX_RXD1n | DP_TXD1n | NC | M |
| 20 | | | | GND | | | | F |
| 21 | NC | HDMI_TXD0P | DP_TXD1p | PCIEX_RXD1p | PCIEX_RXD1p | DP_TXD1p | NC | M |
| 22 | NC | HDMI_TXD1N | DP_TXD0n | PCIEX_TXD2n | DP_TXD0n | DP_TXD0n | TXCn | M |
| 23 | | | | GND | | | | F |
| 24 | NC | HDMI_TXD1P | DP_TXD0p | PCIEX_TXD2p | DP_TXD0p | DP_TXD0p | TXCp | M |
| 25 | NC | HDMI_TXD2N | DP_AUXn | PCIEX_RXD2n | DP_AUXn | DP_AUXn | TXDn | M |
| 26 | | | | GND | | | | F |
| 27 | NC | HDMI_TXD2P | DP_AUXp | PCIEX_RXD2p | DP_AUXp | DP_AUXp | TXDp | M |
| 28 | | | | Reserved | | | | F |
| 29 | | | | GND | | | | F |
| 30 | | | | +5 V | | | | F |
| 31 | | | | SYNC_DM | | | | F |
| 32 | | | | SYNC_DP | | | | F |
| 33 | | | | OTG_ID | | | | F |
| 34 | | | | GND | | | | F |

The letters F and M in the Pin Type column mean "fixed-function" and "multi-function," respectively, and the letters "NC" mean, "Not Connected." The individual pins (HDMI_TXD1P, PCIEX_TXD2p, etc.) of the various communication interfaces (USB 3.0, MHL, DisplayPort, PCI-Express, and HDMI) listed in Table 1 are known to those of skill in the art.

As indicated in Table 1, high-speed signal pairs in various interfaces such as the PCIEX_TXDp/n signal pair in PCI-Express and the DP_TXDn/p signal pair in DisplayPort can be routed on the same pins, for example, pins 13 and 15, as these pins are based on similar low-level electrical interface (AC-coupled differential signaling). This allows the corresponding pin controllers to use common interface circuitry and reduces design complexity, and controller area and cost. High speed interfaces such as HDMI can be made compatible with AC-coupled differential signaling interfaces with the use of inexpensive interface converter chips.

An alternative Table 1 can be as follows:

| | | | Active accessory | | | | | |
|---|---|---|---|---|---|---|---|---|
| Connector | Pin | HDMI | DisplayPort, 4 lanes | PCI express, 2 lanes | Display port 1 lane, PCI express 1 lane | Display port 2 lanes, USB 3.0 | MHL, USB 3.0 | Pin type |
| Accessory | 1 | | | FM_ANT | | | | fixed |
| | 2 | | | ACC_POWER | | | | multi-function |
| | 3 | | | AGND | | | | gnd |

-continued

| Connector | Pin | Active accessory | | | | | | Pin type |
|---|---|---|---|---|---|---|---|---|
| | | HDMI | DisplayPort, 4 lanes | PCI express, 2 lanes | Display port 1 lane, PCI express 1 lane | Display port 2 lanes, USB 3.0 | MHL, USB 3.0 | |
| | 4 | | | AUDIO_L/SPDIF_OUT | | | | multi-function |
| | 5 | | | MIC_IN | | | | multi-function |
| | 6 | | | AUDIO_R/SPDIF_IN | | | | fixed |
| | 7 | | | ACC_UART_TX | | | | fixed |
| | 8 | | | ACC_UART_RX | | | | fixed |
| | 9 | HDMI_HPD | n.c. | n.c. | n.c. | USB3_VBUS | USB3_VBUS | multi-function |
| | 10 | | | PHONE_DET | | | | multi-function |
| | 11 | | | GND | | | | gnd |
| | 12 | HDMI_UTIL | n.c. | n.c. | n.c. | USB3_DP | USB3_DP | multi-function |
| | 13 | HDMI_DDC_DAT | DP_TXD3n | PCIEX_RCKn | PCIEX_RCKn | USB3_RXDp | USB3_RXDp | multi-function |
| | 14 | HDMI_CEC | n.c. | n.c. | n.c. | USB3_DM | USB3_DM | gnd |
| | 15 | HDMI_DDC_CLK | DP_TXD3p | PCIEX_RCKp | PCIEX_RCKp | USB3_RXDn | USB3_RXDn | multi-function |
| | 16 | | | GND | | | | multi-function |
| | 17 | | | GND | | | | gnd |
| | 18 | HDMI_TXD2P | DP_TXD2n | PCIEX_TXD1n | PCIEX_TXD1n | USB3_TXDp | USB_TXDp | multi-function |
| | 19 | HDMI_TXD1P | DP_TXD1n | PCIEX_RXD1n | PCIEX_RXD1n | DP_TXD1n | USB3_ID | multi-function |
| | 20 | HDMI_TXD2N | DP_TXD2p | PCIEX_TXD1p | PCIEX_TXD1p | USB3_TXDn | USB_3 TXDn | gnd |
| | 21 | HDMI_TXD1N | DP_TXD1p | PCIEX_RXD1p | PCIEX_RXD1p | DP_TXD1p | MHL_CTRL | multi-function |
| | 22 | | | GND | | | | multi-function |
| | 23 | | | GND | | | | gnd |
| | 24 | HDMI_TXD0P | DP_TXD0n | PCIEX_TXD2n | DP_TXD0n | DP_TXD0n | MHL_TXCn | multi-function |
| | 25 | HDMI_TXCP | DP_AUXn | PCIEX_RXD2n | DP_AUXn | DP_AUXn | MHL_TXDn | multi-function |
| | 26 | HDMI_TXD0N | DP_TXD0p | PCIEX_TXD2p | DP_TXD0p | DP_TXD0p | MHL_TXCp | gnd |
| | 27 | HDMI_TXCN | DP_AUXp | PCIEX_RXD2p | DP_AUXp | DP_AUXp | MHL_TXDp | multi-function |
| | 28 | | | GND | | | | power |
| | 29 | | | GND | | | | gnd |
| uUSB | 28 | | | USB_VBUS | | | | power |
| | 29 | | | USB_DM | | | | fixed |
| | 30 | | | USB_DP | | | | fixed |
| | 31 | | | USB_OTG_ID | | | | fixed |
| | 32 | | | USB_GND | | | | gnd |

In the alternative Table 1, the HOST_DP and HOST_DM are replaced by ACC_UART_TX and ACC_UART_RX. This means that the primary accessory communication path, which we use to negotiate features, authenticate, etc. can be changed to a simpler serial communication. The USB port (USB_DP and USB_DM) can also be used to do USB-based accessory communication, if the USB port is changed to host mode on the phone and the accessory supports it.

Figure 8A:
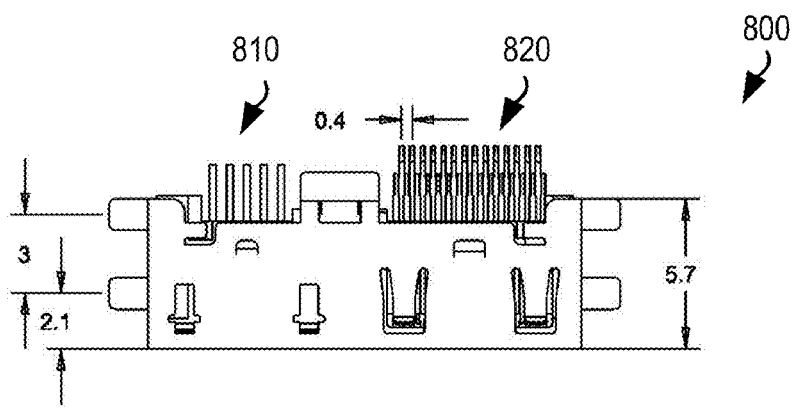
FIG. 8(a) is a top view of an exemplary physical implementation of the host connector of FIG. 4.
Figure 8B:
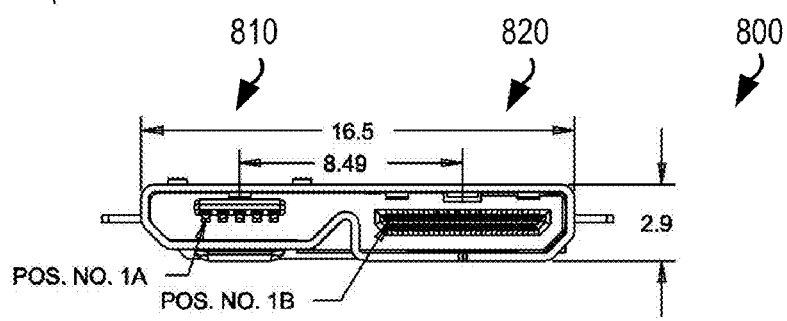
FIG. 8(b) is an end view of an exemplary physical implementation of the host connector of FIG. 4.
Figure 8C:
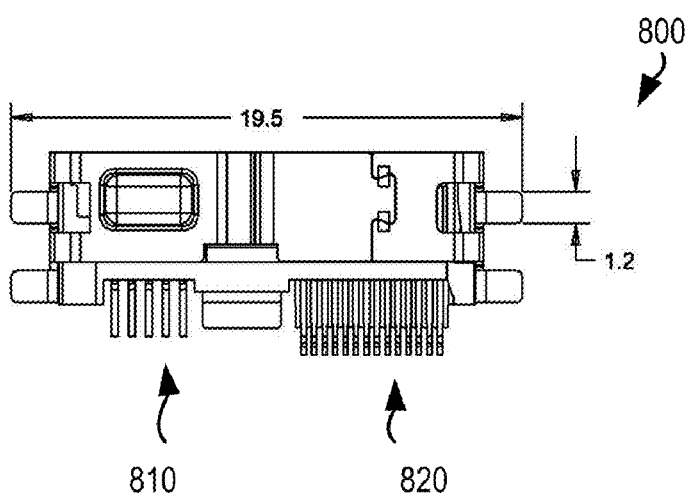
FIG. 8(c) is a bottom view of an exemplary physical implementation of the host connector of FIG. 4.

FIGS. 8(a)-8(c) show top, end and bottom views of an exemplary physical implementation 800 of the host connector 420 of FIG. 4. In this example, the host connector is a single physical connector 800 comprising two physically separate sets of pins 810 and 820. The first group of pins 810 comprises five fixed-function pins and can be used for discovering the accessory connector features. The first group of pins 810 can comprise a USB connection as shown, or any other low pin count serial interface. The second group of pins 820 comprises a combination of 29 fixed-function and multi-function pins. The connector 800 can be integrated into a mobile host device and arranged, for example, at the bottom of the device to allow for a convenient connection to a docking station. The connector 800 can be connected to any wire, cable, docking station, accessory device, etc. having a connector capable of mating with the connector 800.

Figure 9:
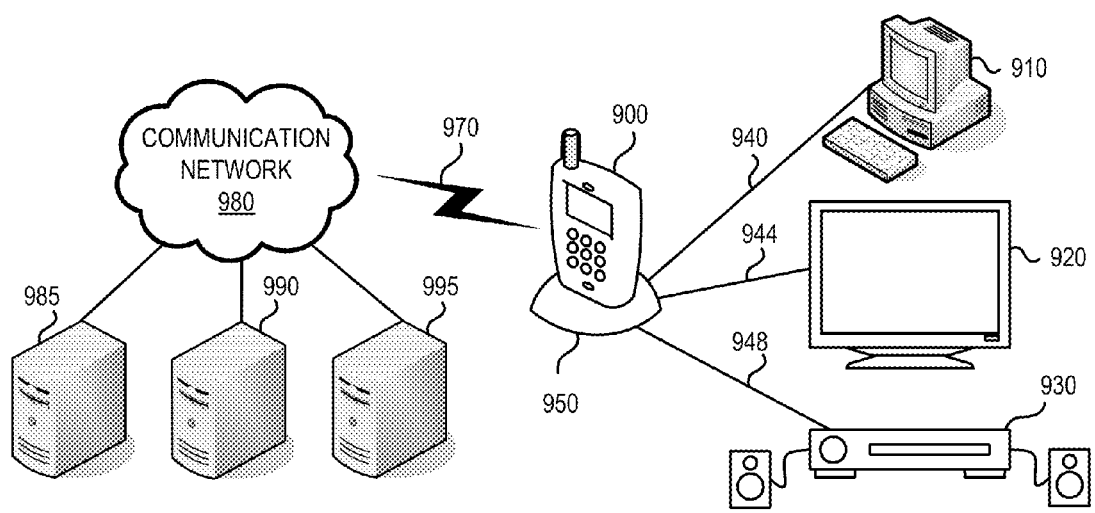
FIG. 9 shows an exemplary mobile host device connected to multiple accessories by a host connector connected to an accessory docking station device.

FIG. 9 shows an exemplary host device 900 connected to multiple accessories 910, 920 and 930 by a docking station device 950. In this configuration, the docking station 950 operates as the accessory device and can have any of the components and functionalities of accessory devices described herein. The docking station 950 can operate as a physical adapter between accessories 910, 920, 930 and the connector of the host 900. Thus, connections 940, 944 and 948 can be cables that conform to existing physical connector standards (mini- or micro-USB or Type A, B, C or D HDMI connectors).

Figure 10:
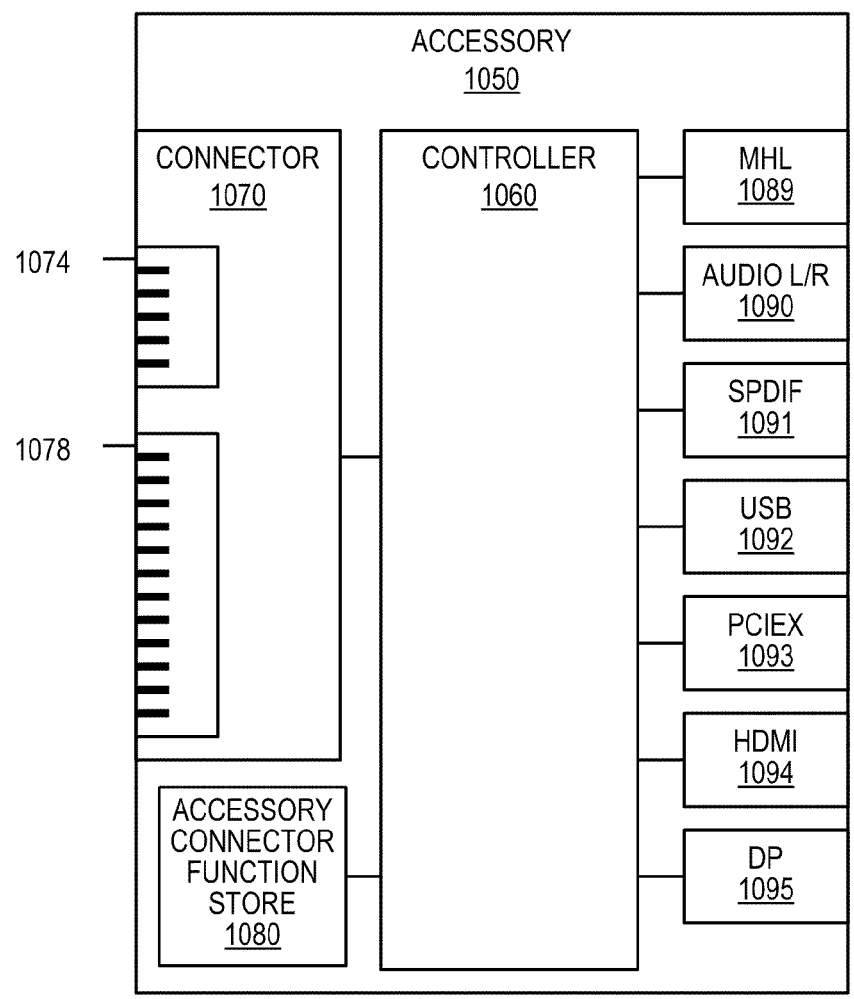
FIG. 10 is a block diagram of an exemplary docking station accessory device capable of connecting to the host connector of FIG. 4.

FIG. 10 shows a block diagram of an exemplary docking station accessory device 1050 capable of connecting to the host connector of FIG. 4. The accessory 1050 comprises a controller 1060, a connector 1070 and an accessory store 1080. The connector 1070 comprises a first group of multi-function pins 1078 and a second group of fixed-function pins 1074. The accessory 1050 also includes a set of physical connectors 1089-1095 that conform to physical connector standards of various communication interfaces. For example, the audio left/right connector 1090 can be a TRS (tip-ring-sleeve) connector and USB connector 1092 can be a micro-USB connector. The accessory 1050 can also comprise an MHL connector 1089, an SPDIF connector 1091, a PCI-Express connector 1093, an HDMI connector 1094 and a DisplayPort connector 1095. Thus, a docking station accessory 1050 can allow multiple accessories to connect to a host connector without requiring a physical redesign of the accessory connectors. The accessory 1050 can be viewed as a switch, routing data from the accessory connector 1070 to one or more of the connectors 1089-1095, depending on the enabled functions of the accessory connector 1050.

Figure 11:
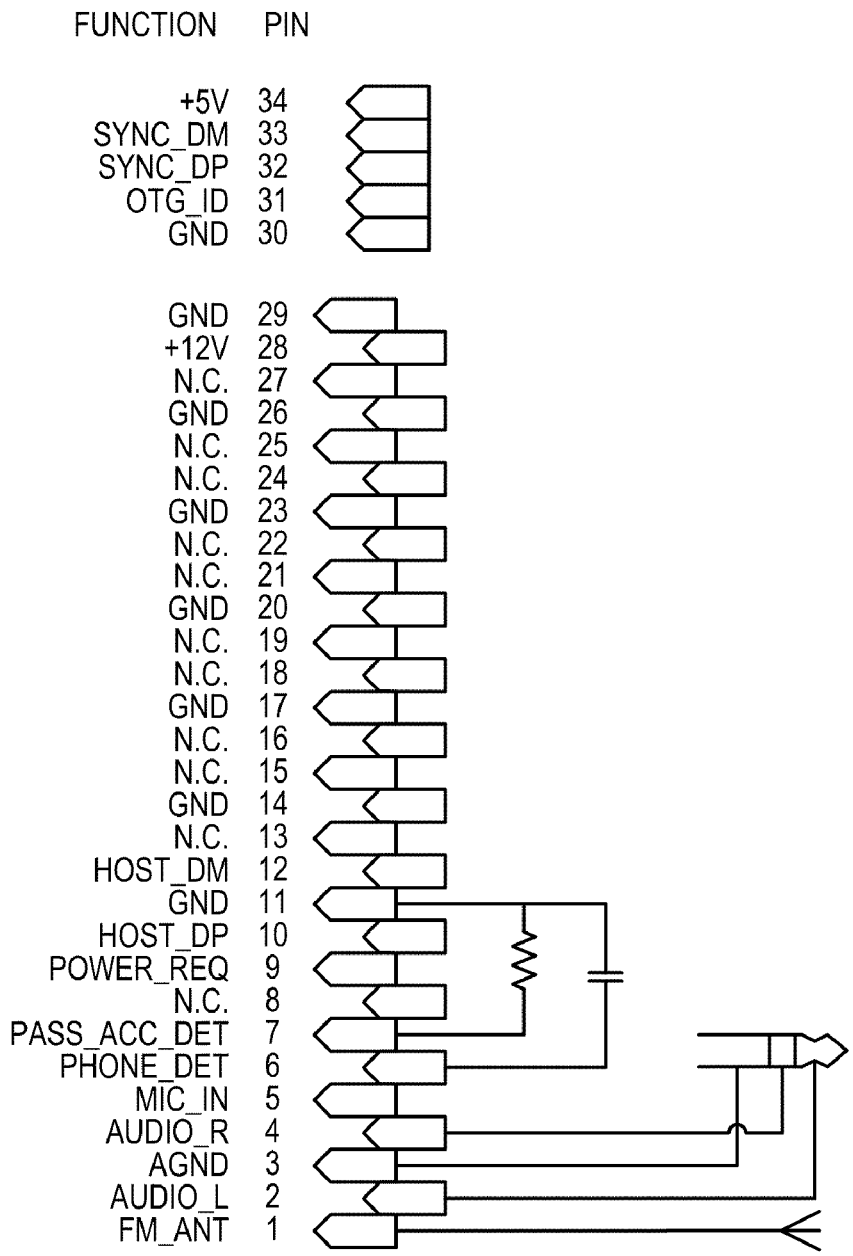
FIG. 11 is a schematic diagram of a stereo cable accessory with built-in FM antenna connected to the exemplary host connector of FIG. 4.
Figure 12:
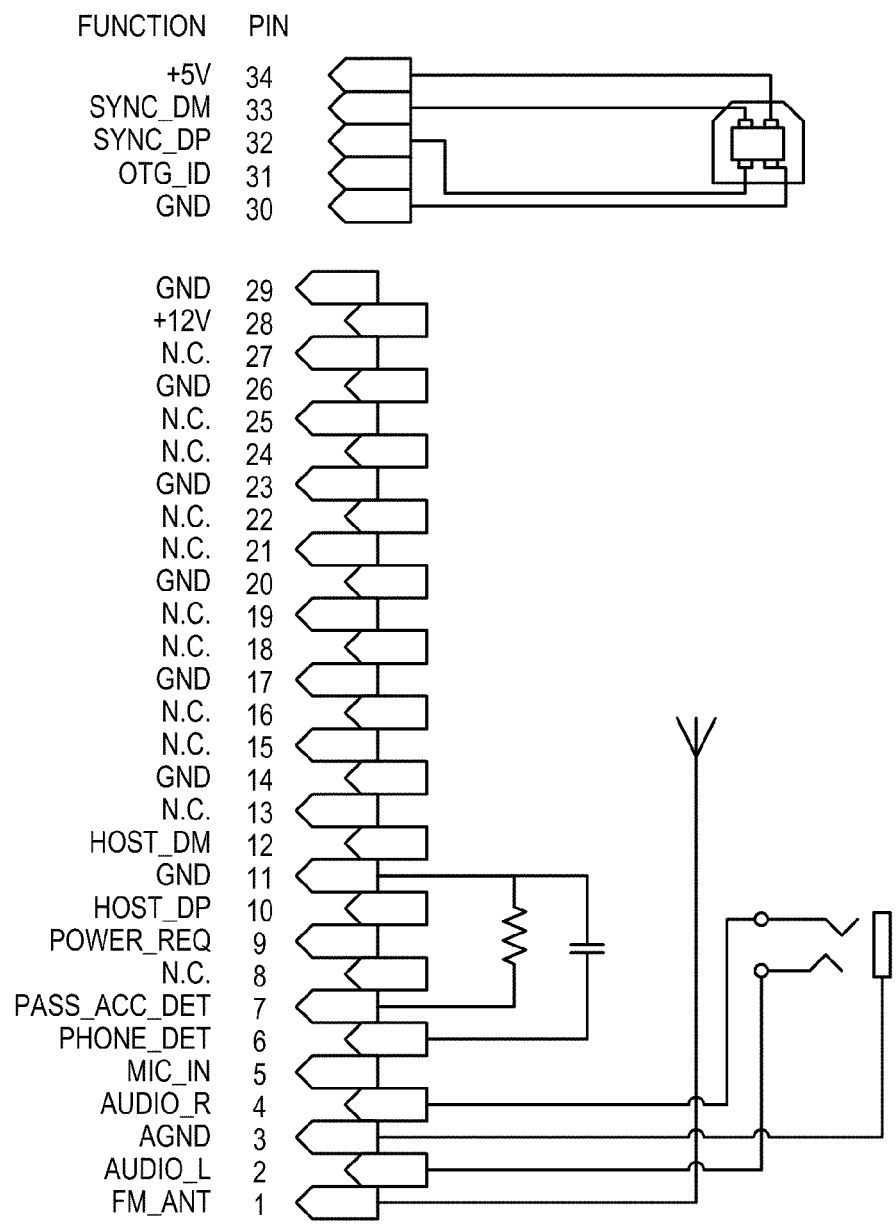
FIG. 12 is a schematic diagram of a passive dock accessory with audio output and synchronization and charge support connected to the exemplary host connector of FIG. 4.
Figure 13:
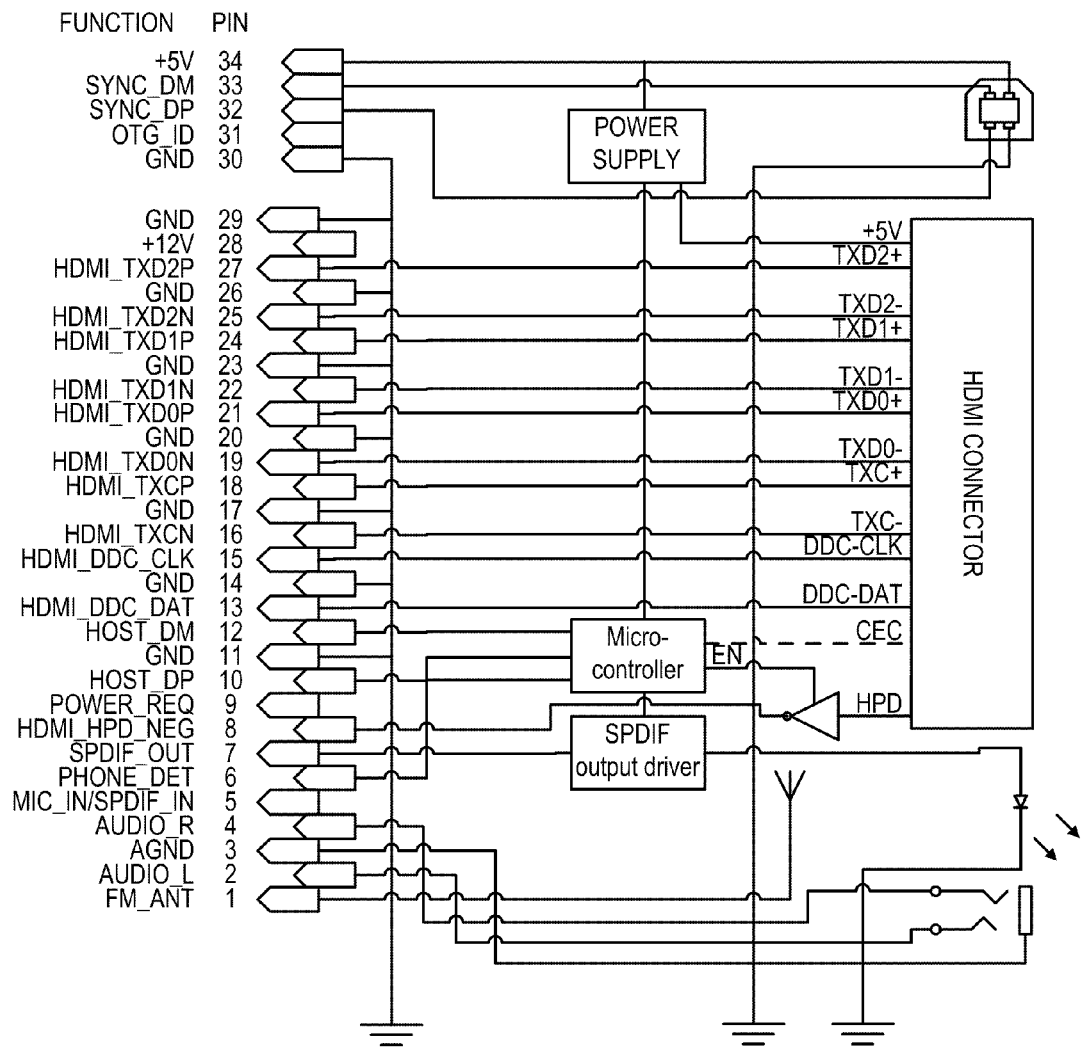
FIG. 13 is a schematic diagram of an active accessory device with HDMI and optical SPDIF output functions connected to the exemplary host connector of FIG. 4.
Figure 14:
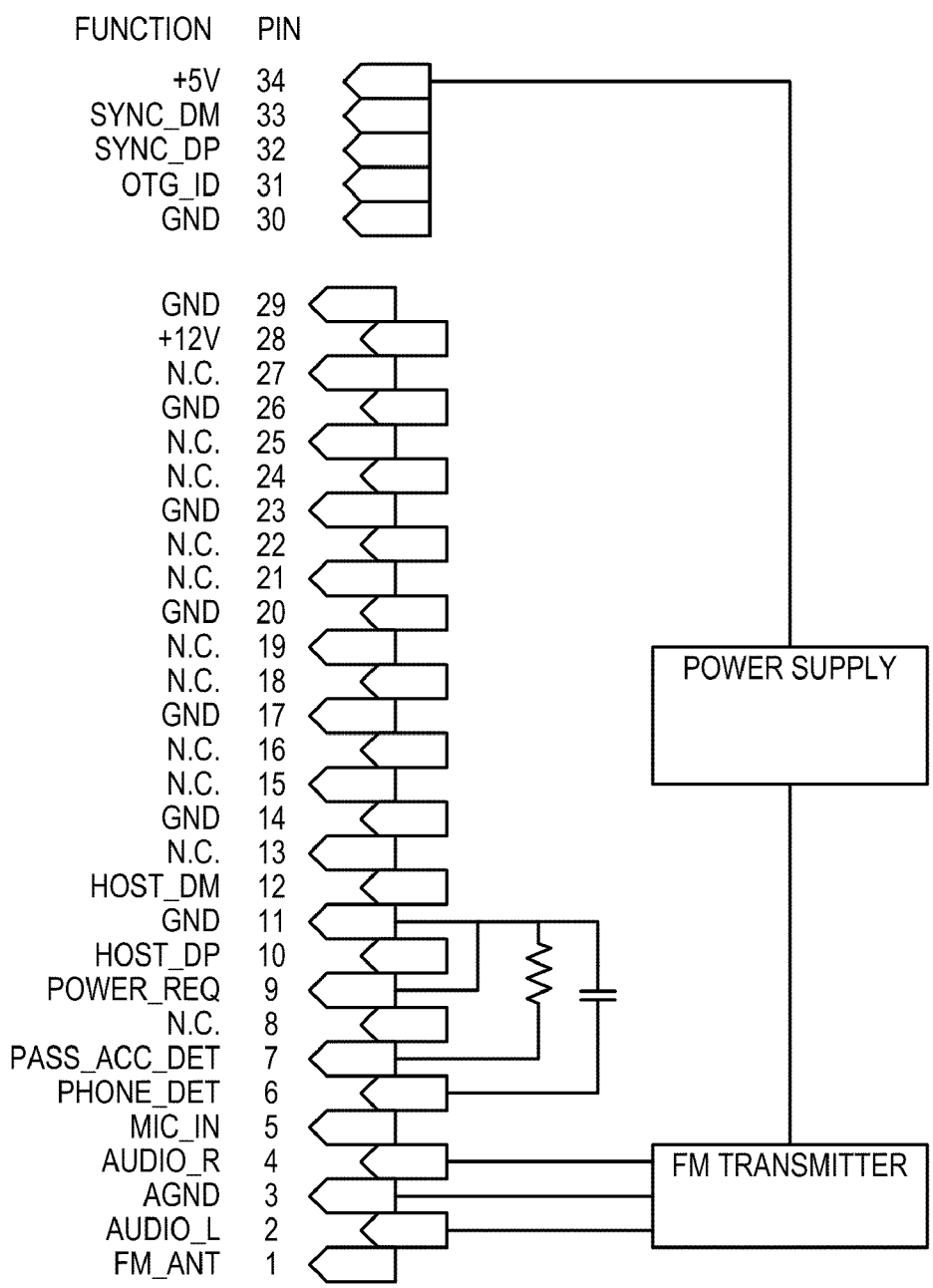
FIG. 14 is a schematic diagram of a phone powered FM transmitter accessory connected to the exemplary host connector of FIG. 4.

FIGS. 11-14 show schematic drawings of exemplary accessories connected to the 39-pin host connector of FIG. 4. FIG. 11 shows a simple stereo cable with a built-in FM antenna (pin 1) as an accessory. FIG. 12 shows a passive dock accessory device with stereo analog audio output (pins 2 and 4). The accessory in FIG. 12 can be synchronized with the host via the SYNC_DM and SYNC_DP pins and can be powered by the host via pin 34. FIG. 13 shows an active dock accessory with HDMI and optical SPDIF output capabilities. FIG. 14 shows an FM transmitter accessory powered by the host via pin 34.

The dynamically configurable host and accessory connectors described herein provide a low pin count connector able to support a wide variety of communication interfaces at the system level. For a given set of connector capabilities, the pin count of a host connector comprising multi-function pins will likely be less than that of a connector comprised entirely of dedicated, fixed-function pins. The connectors as described herein can accommodate the evolving communication capabilities of host and accessory devices. For example, a host connector can be reconfigured as new accessories implement the various interfaces supported by the connector. In addition, the host connector can be integrated into host and accessory devices capable of supporting new functions added to existing protocols or entirely new protocols. Although new controller designs may be needed to support these new functions, the physical design of the connector can remain the same, as long as there are a sufficient number of pins to support the new and updated interfaces. Thus, the connector as described herein is flexible and expandable, is forward and backward compatible to allow older devices to communicate with newer ones, and is less likely to require physical modification as communication interfaces continue to evolve.

Figure 15:
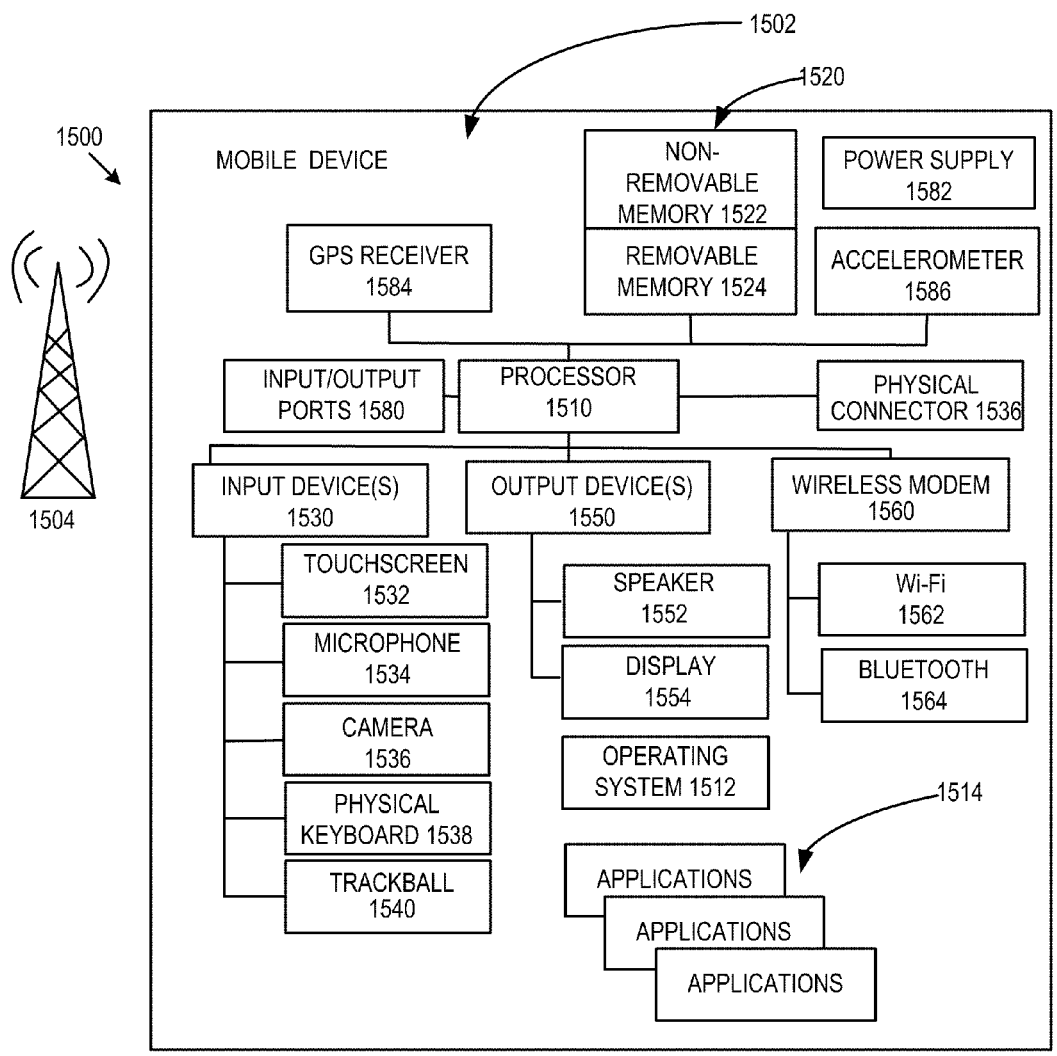
FIG. 15 is a block diagram of an exemplary mobile device.

FIG. 15 is a system diagram depicting an exemplary mobile device 1500 including a variety of optional hardware and software components, shown generally at 1502. The mobile device 1500 can be any host device or accessory device as described herein. Any components 1502 in the mobile device can communicate with any other component, although not all connections are shown, for ease of illustration. The mobile device can be any of a variety of computing devices (e.g., cell phone, smartphone, handheld computer, Personal Digital Assistant (PDA), etc.) and can allow wireless two-way communications with one or more mobile communications networks 1504, such as a cellular or satellite network.

The illustrated mobile device 1500 can include a controller or processor 1510 (e.g., signal processor, microprocessor, ASIC, or other control and processing logic circuitry) for performing such tasks as signal coding, data processing, input/output processing, power control, and/or other functions. An operating system 1512 can control the allocation and usage of the components 1502 and support for one or more application programs 1514. The application programs can include common mobile computing applications (e.g., email applications, calendars, contact managers, web browsers, messaging applications), or any other computing application.

The illustrated mobile device 1500 can include memory 1520. Memory 1520 can include non-removable memory 1522 and/or removable memory 1524. The non-removable memory 1522 can include RAM, ROM, flash memory, a hard disk, or other well-known memory storage technologies. The removable memory 1524 can include flash memory or a Subscriber Identity Module (SIM) card, which is well known in GSM communication systems, or other well-known memory storage technologies, such as "smart cards." The memory 1520 can be used for storing data and/or code for running the operating system 1512 and the applications 1514. Example data can include web pages, text, images, sound files, video data or other data sets to be sent to and/or received from one or more network servers or other devices via one or more wired or wireless networks. The memory 1520 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

The mobile device 1500 can support one or more input devices 1530, such as a touch screen 1532, microphone 1534, camera 1536, physical keyboard 1538 and/or trackball 1540 and one or more output devices 1550, such as a speaker 1552 and a display 1554. Other possible output devices (not shown) can include piezoelectric or other haptic output devices. Some devices can serve more than one input/output function. For example, touchscreen 1532 and display 1554 can be combined in a single input/output device.

A wireless modem 1560 can be coupled to an antenna (not shown) and can support two-way communications between the processor 1510 and external devices, as is well understood in the art. The modem 1560 is shown generically and can include a cellular modem for communicating with the mobile communication network 1504 and/or other radio-based modems (e.g., Bluetooth 564 or Wi-Fi 562). The wireless modem 1560 is typically configured for communication with one or more cellular networks, such as a GSM network for data and voice communications within a single cellular network, between cellular networks, or between the mobile device and a public switched telephone network (PSTN).

The mobile device can further include at least one input/output port 1580, a power supply 1582, a satellite navigation system receiver 1584, such as a Global Positioning System (GPS) receiver, an accelerometer 1586, and/or a physical connector 1536, which can be the connector as described herein. The illustrated components 1502 are not required or all-inclusive, as any components can be deleted and other components can be added.

Figure 16:
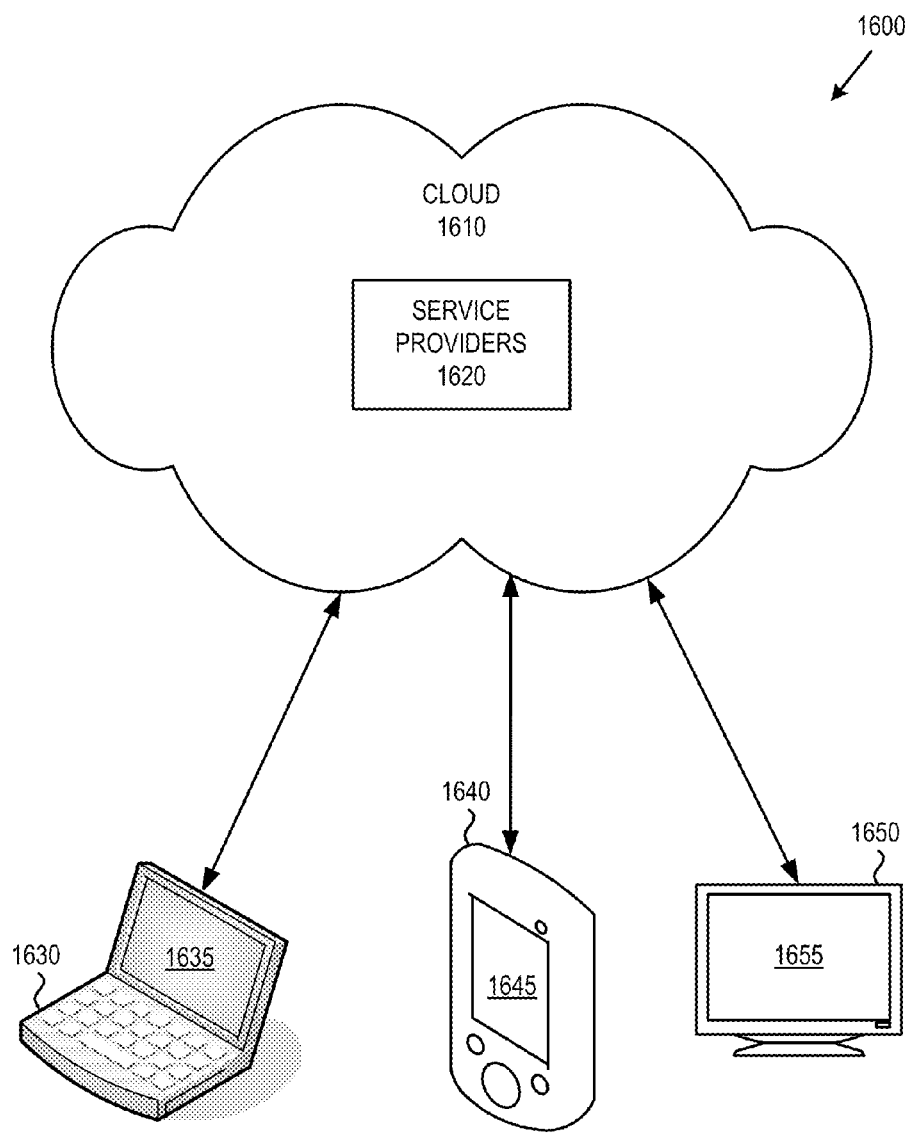
FIG. 16 is a block diagram of a cloud computing environment in which host and accessory devices can operate.

FIG. 16 illustrates a generalized example of a suitable implementation environment 1600 in which described embodiments, techniques, and technologies may be implemented.

In example environment 1600, various types of services (e.g., computing services) are provided by a cloud 1610. For example, the cloud 1610 can comprise a collection of computing devices, which may be located centrally, or distributed, that provide cloud-based services to various types of users and devices connected via a network such as the Internet. The implementation environment 1600 can be used in different ways to accomplish computing tasks. For example, some tasks (e.g., processing user input and presenting a user interface) can be performed on local computing devices (e.g., connected devices 1630, 1640, 1650) while other tasks (e.g., storage of data to be used in subsequent processing) can be performed in the cloud 1610.

In example environment 1600, the cloud 1610 provides services for connected devices 1630, 1640, 1650 with a variety of screen capabilities. Connected device 1630 represents a device with a computer screen 1635 (e.g., a mid-size screen). For example, connected device 1630 could be a personal computer such as desktop computer, laptop, notebook, netbook or the like. Connected device 1640 represents a device with a mobile device screen 1645 (e.g., a small size screen). For example, connected device 1640 could be a mobile phone, smart phone, personal digital assistant, tablet computer and the like. Connected device 1650 represents a device with a large screen 1655. For example, connected device 1650 could be a television screen (e.g., a smart television) or another device connected to a television (e.g., a set-top box or gaming console) or the like. One or more of the connected devices 1630, 1640, 1650 can include touch screen capabilities. Touchscreens can accept input in different ways. For example, capacitive touchscreens detect touch input when an object (e.g., a fingertip or stylus) distorts or interrupts an electrical current running across the surface. As another example, touchscreens can use optical sensors to detect touch input when beams from the optical sensors are interrupted. Physical contact with the surface of the screen is not necessary for input to be detected by some touchscreens. Devices without screen capabilities also can be used in example environment 1600. For example, the cloud 1610 can provide services for one or more computers (e.g., server computers) without displays.

Services can be provided by the cloud 1610 through service providers 1620, or through other providers of online services (not depicted). For example, cloud services can be customized to the screen size, display capability, and/or touch screen capability of a particular connected device (e.g., connected devices 1630, 1640, 1650).

In example environment 1600, the cloud 1610 provides the technologies and solutions described herein to the various connected devices 1630, 1640, 1650 using, at least in part, the service providers 1620. For example, the service providers 1620 can provide a centralized solution for various cloud-based services. The service providers 1620 can manage service subscriptions for users and/or devices (e.g., for the connected devices 1630, 1640, 1650 and/or their respective users).

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., non-transitory computer-readable media, such as one or more optical media discs, volatile memory components (such as DRAM or SRAM), or nonvolatile memory components (such as hard drives)) and executed on a computer (e.g., any commercially available computer, including smart phones or other mobile devices that include computing hardware). Any of the computer-executable instructions for implementing the disclosed techniques as well as any data created and used during implementation of the disclosed embodiments can be stored on one or more computer-readable media (e.g., non-transitory computer-readable media). The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

Additional embodiments and aspects of the technologies described herein are described in the following numbered embodiments.

Embodiment 1

A method of configuring a connector (220, 420) of a mobile host device (200, 400) for connecting to a connector (270, 1070) of an accessory device (250, 1050), comprising: at the mobile host device (200, 400), selecting one or more functions to be enabled for connecting to the accessory device (250, 1050), wherein the accessory device is releasably attached to the mobile host device; configuring one or more pins (228) of the mobile host device connector (220, 420), the configuring comprising enabling the one or more selected functions at the mobile host device connector (220, 420); and instructing the accessory device (250, 1050) to configure one or more pins (278, 1078) of the accessory device connector (270,1070) to support the one or more selected functions.

Embodiment 2

The method of any of the previous numbered embodiments, further comprising: requesting functions supported by the accessory device connector (270,1070) from the accessory device (250,1050); and receiving an indication of one or more functions supported by the accessory device connector (270,1070) from the accessory device (250,1050).

Embodiment 3

The method of any of the previous numbered embodiments, wherein: the mobile host device connector (220,420) comprises one or more fixed-function pins (224) and one or more multi-function pins (228); the one or more functions supported by the accessory device connector (270,1070) are received at the one or more fixed-function pins (224); the one or more functions to be enabled at the accessory device (250, 1050) are sent from the one or more fixed-function pins (224); and the one or more pins of the mobile host device (200,400) that are configured are multi-function pins (228).

Embodiment 4

The method of any of the previous numbered embodiments, determining that data currently being transferred or scheduled to be transferred between the mobile host device (200, 400) and the accessory device (250, 1050) can be transferred at a higher data rate by enabling an additional function of the mobile host device connector (220, 420); reconfiguring the one or more pins (228) of the mobile host device connector (220, 420), the reconfiguring comprising enabling the additional function at the mobile host device connector (220, 420); instructing the accessory device (250, 1050) to reconfigure the one or more pins (278, 1078) of the accessory device connector (270, 1070) to support the additional function; and using the additional function to transfer data between the mobile host device (200, 400) and the accessory device (250, 1050).

Embodiment 5

The method of any of the previous numbered embodiments, further comprising: determining that an operation currently being performed or scheduled to be performed on the mobile host device (200, 400) involves the transfer of video data between the mobile host device (200, 400) and the accessory device (250, 1050); determining that HDMI (High-Definition Multimedia Interface) is not enabled at the mobile host device connector (220, 420); in response to determining that an operation currently being performed or scheduled to be performed on the mobile host device involves the transfer of video data between the mobile host device and the accessory device and that HDMI is not enabled at the mobile host device connector: reconfiguring the one or pins (228) of the mobile host device connector (220, 420) to support HDMI, the reconfiguring comprising enabling HDMI at the mobile host device connector (220, 420); and instructing the accessory device (250, 1050) to reconfigure the one or more pins (278, 1078) of the accessory device connector (270, 1070) to support HDMI.

Embodiment 6

The method of any of the previous numbered embodiments, further comprising: detecting detachment of the accessory device (250, 1050) from the mobile host device (200, 400); detecting attachment of a second accessory device (250, 1050) to the mobile host device (200, 400), the second accessory device (250, 1050) comprising a second accessory device connector (270, 1070); requesting functions supported by the second accessory device connector (270, 1070) from the mobile host device (200, 400); receiving an indication of one or more functions supported by the second accessory device connector (270, 1070) from the second accessory device (250, 1050); at the mobile host device (200, 400), selecting one or more second functions to be enabled for connecting the mobile host device (200, 400) to the second accessory device (250, 1050); reconfiguring one or more pins (228) of the mobile host device connector (220, 420), the reconfiguring comprising enabling the one or more second selected functions at the mobile host device connector (220, 420); and instructing the second accessory device (250, 1050) to reconfigure the one or more pins (278, 1078) of the second accessory device connector (270, 1070) to support the one or more second selected functions.

Embodiment 7

The method of any of the previous numbered embodiments, further comprising: detecting detachment of the accessory device (250, 1050) from the mobile host device (200, 400) and in response to detecting detachment of the accessory device (250, 1050) from the mobile host device (200, 400), reconfiguring the one or more pins (228) of the mobile host device connector (220, 420) to support a default set of functions or to return the mobile host device connector to a previous configuration.

Embodiment 8

The method of any of the previous numbered embodiments, further comprising: receiving from the accessory device (250, 1050) an indication of one or more suggested functions to be enabled; and wherein the selecting one or more functions to be enabled for connecting the mobile host device (200, 400) to the accessory device (250, 1050) is based in part on the one or more suggested functions to be enabled received from the accessory device (250, 1050).

Embodiment 9

A method of configuring a connector (270, 1070) of an accessory device (250, 1050) for connecting to a connector (270, 1070) of a mobile host device (200, 400), comprising: sending, to the mobile host device (200, 400), an indication of one or more functions supported by the accessory device connector (270, 1070), the accessory device releasably attached to the mobile host device; receiving an instruction from the mobile host device (200, 400) to configure one or more pins (278, 1078) of the accessory device connector (270, 1070) to support one or more functions selected by the mobile host device (200, 400); and configuring the one or more pins (278, 1078) of the accessory device connector (270, 1070) for connecting to the mobile host device (200, 400), the configuring comprising enabling the one or more functions selected by the mobile host device (200, 400) at the accessory device connector (270, 1070).

Embodiment 10

The method of any of the previous numbered embodiments, further comprising: receiving a request from the mobile host device (200, 400) for the one or more functions supported by the accessory device connector (270, 1070).

Embodiment 11

The method of any of the previous numbered embodiments, further comprising: receiving an instruction from the mobile host device (200, 400) to reconfigure the one or more pins (278, 1078) of the accessory device connector (270, 1070) to support one or more second selected functions; and reconfiguring the one or more pins (278, 1078) of the accessory device connector (270, 1070), the reconfiguring comprising enabling the one or more second selected functions at the accessory device connector (270, 1070).

Embodiment 12

The method of any of the previous numbered embodiments, the accessory device connector (270, 1070) comprises one or more fixed-function pins (274, 1074) and one or more multi-function pins (278, 1078); the indication of the one or more functions supported by the accessory device connector (250, 1050) is sent from one or more of the one or more fixed-function pins (274, 1074); and the instruction to reconfigure the one or more pins is received at one or more of the one or more fixed-function pins (274, 1074).

Embodiment 13

A mobile host device, comprising: a connector (220, 270, 420, 1070) comprising one or more fixed-functions pins (224, 274, 1074) and one or more multi-function pins (228, 278, 1078); a controller (210, 260, 410, 1060); and one or more computer-readable media storing computer-executable instructions for causing the mobile host device (200, 400) to perform a method of configuring the mobile host device connector (220, 420) for connecting to a releasably attachable accessory device (250, 1050), the method comprising: requesting functions supported by an accessory device connector (270, 1070) from the accessory device (250, 1050); receiving an indication of one or more functions supported by the accessory device connector (270, 1070) from the accessory device (250, 1050); at the mobile host device (200, 400), selecting one or more functions to be enabled for connecting the mobile host device (200, 400) to the accessory device (250, 1050); configuring one or more pins (228) of the mobile host device connector (220, 420), the configuring comprising enabling the one or more selected functions at the mobile host device connector (220, 420); and instructing the accessory device (250, 1050) to configure one or more pins (278, 1078) of an accessory device connector (270, 1070) to support the one or more selected functions.

Embodiment 14

The device of any of the previous numbered embodiments, wherein: the one or more functions supported by the accessory device connector (270, 1070) is received at the one or more fixed-function pins (224, 274, 1074); the one or more functions are sent from the one or more fixed-function pins (224, 274, 1074); and the one or more pins of the mobile host device (200, 400) that are configured are multi-function pins (228, 278, 1078).

Embodiment 15

The device of any of the previous numbered embodiments, wherein the connector (800) comprises a first group of pins physically separated from a second group of pins (810, 820), the first group of pins (810) comprises one or more of the one or more fixed-functions pins (224, 274, 1074) and the second group of pins (820) comprises the one or more multi-function pins (228, 278, 1078) and the remainder of the one or more fixed-function pins (224, 274, 1074).

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. A method of configuring a connector of a mobile host device for connecting to a connector of an accessory device, comprising:
   receiving an indication of one or more functions supported by the accessory device connector from the accessory device;
   at the mobile host device, selecting one or more functions to be enabled for connecting to the accessory device, wherein the accessory device is releasably attached to the mobile host device;
   configuring one or more pins of the mobile host device connector, the configuring comprising enabling the one or more selected functions at the mobile host device connector; and
   instructing the accessory device to configure one or more pins of the accessory device connector to support the one or more selected functions;
   determining that data currently being transferred or scheduled to be transferred between the mobile host device and the accessory device can be transferred by using one or more additional functions of the mobile host device connector; and
   in response to the determining:
      reconfiguring the one or more pins of the mobile host device connector, the reconfiguring comprising enabling the one or more additional functions at the mobile host device connector;
      instructing the accessory device to reconfigure the one or more pins of the accessory device connector to support the one or more additional functions; and
      using the one or more additional functions to transfer the data between the mobile host device and the accessory device; and
   wherein the one or more pins of the mobile host device connector comprises one or more fixed-function pins and one or more multi-function pins.

2. The method of claim 1, further comprising
   requesting functions supported by the accessory device connector from the accessory device.

3. The method of claim 2, wherein:
   the one or more functions supported by the accessory device connector are received at the one or more fixed-function pins;
   the one or more functions to be enabled at the accessory device are sent from the one or more fixed-function pins; and
   the one or more pins of the mobile host device that are configured are multi-function pins.

4. The method of claim 1, wherein the mobile host device connector is unconfigured or in a previous configuration before enabling the one or more selected functions at the mobile host device connector.

5. The method of claim 1, wherein one of the one or more additional functions is HDMI (High-Definition Multimedia Interface).

6. The method of claim 1, further comprising:
   detecting detachment of the accessory device from the mobile host device;
   detecting attachment of a second accessory device to the mobile host device, the second accessory device comprising a second accessory device connector;
   requesting functions supported by the second accessory device connector from the mobile host device;
   receiving an indication of one or more functions supported by the second accessory device connector from the second accessory device;
   at the mobile host device, selecting one or more second functions to be enabled for connecting the mobile host device to the second accessory device;
   reconfiguring the one or more pins of the mobile host device connector, the reconfiguring comprising enabling the one or more second selected functions at the mobile host device connector; and
   instructing the second accessory device to reconfigure the one or more pins of the second accessory device connector to support the one or more second selected functions.

7. The method of claim 1, further comprising:
   detecting detachment of the accessory device from the mobile host device; and
   in response to the detecting detachment of the accessory device from the mobile host device, reconfiguring the one or more pins of the mobile host device connector to support a default set of functions or to return the mobile host device connector to a previous configuration.

8. The method of claim 1, further comprising:
   receiving from the accessory device an indication of one or more suggested functions to be enabled; and
   wherein the selecting one or more functions to be enabled for connecting the mobile host device to the accessory device is based in part on the one or more suggested functions to be enabled received from the accessory device.

9. A method of configuring a connector of an accessory device for connecting to a connector of a mobile host device, comprising:
   sending, to the mobile host device, an indication of one or more functions supported by the accessory device connector, the accessory device releasably attached to the mobile host device;
   receiving an instruction from the mobile host device to configure one or more pins of the accessory device connector to support one or more functions selected by the mobile host device;
   configuring the one or more pins of the accessory device connector for connecting to the mobile host device, the configuring comprising enabling the one or more functions selected by the mobile host device at the accessory device connector;
   receiving an instruction from the mobile host device to reconfigure the one or more pins of the accessory device connector to support one or more second selected functions; and
   determining that data currently being transferred or scheduled to be transferred between the mobile host device and the accessory device can be transferred by using one or more additional functions of the mobile host device connector;
   in response to the determining:
      reconfiguring the one or more pins of the accessory device connector, the reconfiguring comprising enabling the one or more second selected functions at the accessory device connector;
      instructing the accessory device to reconfigure the one or more pins of the accessory device connector to support the one or more additional functions; and
      using the one or more additional functions to transfer the data between the mobile host device and the accessory device;
   wherein the one or more pins of the accessory device connector comprises one or more fixed-function pins and one or more multi-function pins.

10. The method of claim 9, further comprising:
    receiving a request from the mobile host device for the one or more functions supported by the accessory device connector.

11. The method of claim 9, wherein at least one function supported by the accessory device connector is not included in the indication of the one or more functions supported by the accessory device connector sent to the mobile host device.

12. The method of claim 9, wherein the accessory device connector is unconfigured or in a previous configuration prior to configuring the one or more pins of the accessory device connector.

13. The method of claim 9, wherein:
    the indication of the one or more functions supported by the accessory device connector is sent from the one or more of the fixed-function pins; and
    the instruction to reconfigure the one or more pins is received at the one or more fixed-function pins.

14. The method of claim 9, further comprising:
    detecting detachment of the accessory device from the mobile host device; and
    reconfiguring the one or more pins of the accessory device connector to support a default set of functions or to return the accessory device connector to a previous configuration.

15. A host device, comprising:
    a host device connector comprising one or more fixed-function pins and one or more multi-function pins;
    a controller; and
    one or more computer-readable storage media storing computer-executable instructions for causing the host device to perform a method of configuring the host device connector for connecting to a releasably attached accessory device, the method comprising:
       requesting functions supported by an accessory device connector from the accessory device;
       receiving an indication of one or more functions supported by the accessory device connector from the accessory device;
       at the host device, selecting one or more functions to be enabled for connecting the host device to the accessory device;
       configuring one or more pins of the host device connector, the configuring comprising enabling the one or more selected functions at the host device connector;
       instructing the accessory device to configure one or more pins of an accessory device connector to support the one or more selected functions; and
       determining that data currently being transferred or scheduled to be transferred between the host device and the accessory device can be transferred by using one or more additional functions of the host device connector;

in response to the determining:

reconfiguring the one or more pins of the host device connector depending on an operation currently being performed or scheduled to be performed on the host device, the reconfiguring comprising enabling the one or more additional functions at the host device connector;

instructing the accessory device to reconfigure the one or more pins of the accessory device connector to support the one or more selected functions; and using the one or more additional functions to transfer data between the host device and the accessory device.

16. The host device of claim 15, wherein:

the one or more functions supported by the accessory device connector is received at the one or more fixed-function pins;

the one or more functions are sent from the one or more fixed-function pins; and the one or more pins of the host device that are configured are multi-function pins.

17. The host device of claim 15, wherein the mobile device connector comprises a first group of pins physically separated from a second group of pins, the first group of pins comprises one or more of the one or more fixed-function pins and the second group of pins comprises the one or more multi-function pins and the remainder of the one or more fixed-function pins.

18. The host device of claim 15 further comprising a host connector function store storing one or more functions supported by the host device connector.

* * * * *